(12) United States Patent
Repici

(10) Patent No.: US 7,904,398 B1
(45) Date of Patent: Mar. 8, 2011

(54) ARTIFICIAL SYNAPSE COMPONENT USING MULTIPLE DISTINCT LEARNING MEANS WITH DISTINCT PREDETERMINED LEARNING ACQUISITION TIMES

(76) Inventor: Dominic John Repici, Riverside, NJ (US)

( * ) Notice: Subject to any disclaimer, the term of this patent is extended or adjusted under 35 U.S.C. 154(b) by 781 days.

(21) Appl. No.: 11/689,676

(22) Filed: Mar. 22, 2007

Related U.S. Application Data

(63) Continuation-in-part of application No. 11/258,639, filed on Oct. 26, 2005, now abandoned.

(51) Int. Cl.
*G06F 15/18* (2006.01)
*G06N 3/00* (2006.01)
*G06N 3/08* (2006.01)

(52) U.S. Cl. .............. 706/15; 706/25; 706/26; 706/27; 706/39

(58) Field of Classification Search ............. 706/15
See application file for complete search history.

(56) References Cited

U.S. PATENT DOCUMENTS

| | | |
|---|---|---|
| 3,950,733 A | 4/1976 | Cooper et al. |
| 4,918,618 A | 4/1990 | Tomlinson, Jr. |
| 5,050,095 A | 9/1991 | Samad |
| 5,119,469 A | 6/1992 | Alkon et al. |
| 5,253,329 A | 10/1993 | Villarreal et al. |
| 5,467,428 A | 11/1995 | Ulug |
| 5,479,574 A | 12/1995 | Glier et al. |
| 5,671,337 A | 9/1997 | Yoshihara |
| 5,704,016 A | 12/1997 | Shigematsu et al. |
| 5,822,742 A | 10/1998 | Alkon et al. |
| 6,219,658 B1 | 4/2001 | Gordon |
| 6,269,351 B1 | 7/2001 | Black |
| 6,424,961 B1 | 7/2002 | Ayala |
| 7,080,053 B2 | 7/2006 | Adams et al. |

OTHER PUBLICATIONS

Li, A Sigma-Pi-Sigma Neural Network (SPSNN), 2003.*
Beaugé et al., Neuromodulation Mechanisms for the Cooperation of Artificial Neural Networks, NEURAP'95, 1995.*
Journal of Intelligent and Robotic Systems 14: pp. 343-345, 1995, Calendar of Events.*
Sabhnani et al., "Application of Machine Learning Algorithms to KDD Intrusion Detection Dataset within Misuse Detection Context", 2003.*
Riedmiller, "Rprop—Description and Implementation Details", 1994.*
DBLP Maheshkumar Sabhnani.*
Douglas et al., "The role of synapses in cortical computation", Journal of Neurocytology 25, 893-911, 1996.*

(Continued)

*Primary Examiner* — Michael B. Holmes
*Assistant Examiner* — Nathan H Brown, Jr.

(57) ABSTRACT

Neuron component and method for use in artificial neural networks (ANNs) with input synapses (204, 204b . . . 204n), each synapse includes multiple weights called synapse weights (206-1, 206-2, 206-3). Each synapse further includes a facility to modulate, or gate, an input signal connected to the synapses, by each of the respective synapse weights within the synapse, supplying the result of each modulating operation. The neuron also sums the results of all modulating operations, and subjects the results to a transfer function. Each of the multiple weights associated with a given synapse, may be specified to have its own weight-adjustment facility (214, 214b, 214c), with its own error-values (216, 216b, 216c), and its own specified learning and aspect (1000) includes a separate sum (1018, 1018b) and transfer function (1020, 1020b) for each synapse weight.

16 Claims, 14 Drawing Sheets

OTHER PUBLICATIONS

William P. Jones, Josiah Hoskins, "Back-Propagation, A generalized delta learning rule," Byte, Oct. 1987, pp. 155-162, vol. 12, No. 11, McGraw-Hill.

DARPA, Autonomous Ground Vehicle Grand Challenges for 2004 through 2006, Internet http://www.darpa.mil/grandchallenge/overview.asp.

Cheng-Lin Liu, and Hiromichi Fugisawa, Classification and Learning for Character Recognition: Comparison of Methods and Remaining Problems, NNLDAR, Internet: http://www.dsi.unifi.it/NNLDAR, Aug. 29, 2005.

Levitan, Irwin B. and Kaczmarek, Leonard K., The Neuron: Cell and Molecular Biology, Third Edition, ISBN: 0-19-514523-2, 2002, 603 Pages, Oxford University Press, U.S.A.

Anil K. Jain, Jianchang Mao, K.M. Mohiuddin, "Artificial Neural Networks: A Tutorial," Computer, vol. 29, No. 3, pp. 31-44, Mar. 1996.

Hand, Charles, An Improved Autoassociative Network for Controlling Autonomous Robots, Oct. 2003, JPL New Technology Report NPO-21224 (NASA Tech Brief vol. 27, No. 10), Jet Propulsion Laboratory, Pasadena, California.

* cited by examiner

*(Prior Art)*

ARTIFICIAL SYNAPSE COMPONENT USING MULTIPLE DISTINCT LEARNING MEANS WITH DISTINCT PREDETERMINED LEARNING ACQUISITION TIMES

CROSS-REFERENCE TO RELATED APPLICATION

This application is a CIP of Ser. No. 11/258,639, filed Oct. 26, 2005, which is incorporated by reference.

BACKGROUND

1. Reference to Computer Program

Appendix I of this application contains two attached files with program listings written in the C programming language, which implement a first embodiment (Embod1_c.txt) and a second embodiment (Embod2_c.txt) as described in this specification.

2. Field

The disclosure relates to the field of artificial neural networks, specifically to an improved neuron component for such networks. Such components provide long- and short-term learning capabilities suitable for pattern recognition, continuously adapting automation tasks, and associative memory tasks.

3. Prior-Art

Artificial neural networks (ANNs), and the neurons that comprise them are electronic circuits or software circuit simulations that roughly attempt to mimic the functions of neurons in the biological fields, sometimes referred to as biological brain cells, and interconnected collections of such biological brain cells. They have considerable history in fields relating to automation, pattern recognition, artificial intelligence, and computation. Today they can be found in wide use.

In general, ANNs are systems in which some number of neurons, or neuron units (artificial brain cell simulations) are connected together. Input signals from outside of the ANN may also be connected to the inputs of some of the neurons making up the ANN. Also, some of the outputs of neurons within the ANN will generally serve as the desired output signals produced by the ANN. ANNs differ from conventional logic circuits in that they respond to input signals (input to output mappings) by altering the relative strengths of the connections between neurons. Logic circuits, on the other hand, map input signals to outputs based on static logic functions. In an ANN, the strength of each connection made to a neuron can be altered by a learning algorithm to produce a more desired response to a given set of inputs. A logic circuit will produce an output that is the equivalent of performing a Boolean function of its input signals. An AND gate, for example, will produce an output that represents the result of performing a Boolean AND operation on its inputs, i.e., a one output only when both of two inputs are ones.

Neurons have input synapses which are roughly analogous to synapses in biological brain cells. A synapse is an input connection from the neuron to an axon (a signal-carrying nerve or means) that possesses elasticity. That is, it is a connection to the neuron in which the strength of the connection may be altered. Artificial neurons contain connection weights within their input synapses whose values can be changed to alter the connection strength to the synapse. Such input synapses effectively modulate the strength of connections between neurons or between neurons and external signal sources. Neurons and networks of neurons can be "trained" to respond correctly to outside signals by changing the values of such connection weights. This effectively changes the strengths of those connections, which alters how the neuron's output responds to a given set of inputs.

Neural networks consisting of neurons are typically trained ahead of time with a representative set of mappings between a set of expected inputs, and the desired outputs the network should produce in response to each of those inputs. The neural network, once trained, is able to provide responses to novel input patterns that were not known at the time it was trained. It possesses this ability because it is able to generate a new output from the patterns in the original representative training set. This leads to one of the primary advantages of neural networks, which is that they are particularly suited for situations where the exact inputs that will be present when the network runs cannot be known ahead of time, while it is being trained.

Neuron Structure—FIG. 1

The most important element within a conventional neural network is a neuron (sometimes called a processing unit, or neurode, to distinguish it from its biological counterpart). Multiple input values are conveyed to the neuron via its synapses. Its single output, in turn, conveys the result of the neuron's processing of inputs. Its output is sometimes referred to as its axon. The signals or values connected to a neuron's inputs can be the outputs of other neurons, or they can originate from external sources, such as sensors, or databases. In digital neuron systems, signals that are used as inputs and outputs are represented numerically. They are usually a positive number. In floating point representations (number of decimal places not fixed) the number is usually between 0.0 and 1.0 (inclusive), e.g., 0.1374. Other representations are possible, such as integer values or voltage levels. The values that are supplied to a neuron's input will sometimes be referred to here as axon levels (AL), because they are the value levels which the neurons permit to be conveyed on input and output axons.

Neurons also use connection weights, most often simply referred to as weights here and in the prior-art. Such weights are used to modulate, or gate, the values on their inputs. In floating-point representation, the value on a given input is gated or modulated by the weight value by simply multiplying the input value by the weight value. The term 'gate' is sometimes used here as a more general term for a modulation effect that is preformed with a simple multiplication in floating-point arithmetic. The results of modulating each input value by the weight value in all the synapses in the neuron are then summed to produce a preliminary output or internal sum of all the weighted inputs for the neuron. The preliminary sum is further passed through a transfer function in order to limit it to a predetermined range (usually 0.0 to 1.0) permitted for axon levels. The result is then made available on the output of the neuron. It can be connected to the inputs of other neurons, or used by external processes, such as motors, display indicators, or databases.

FIG. 1 shows a schematic depiction of a typical prior-art neuron along with some of its primary components. The components making up the neuron are the neuron's body 100, an output axon 102, input synapses or connections 104, 104b, . . . 104n containing weights 106, 106b, . . . 106n holding weight values (labeled $W_1$ through $W_n$ in FIG. 1). The neuron body calculates an output value (X), which is conveyed on its axon 102. The neuron's axon can be used to connect the neuron's output value to other neurons in a neural network, or to external processes. Other axons can be connected to the neuron's input synapses 104, 104b, . . . 104n. Axons 108, 108b, . . . 108n connected to the neuron via its synapses can originate at other neurons in a neural network, or from external processes. In some neural networks, they can even be fed back from the their own neuron's output axon 102. In many of the most popular neural network configurations however, no feedback is used. There is no typical number of inputs to a neuron. Depending on the application, a neuron may have as few as one input, a few, thousands, millions, or even more.

Each weight value 106, 106b, . . . 106n is depicted as a box at the synapse between the incoming axon and the neuron body.

Modulating Input Value by Weight Value—FIG. 1

When processing and propagating input signals (signal propagation phase), the values supplied to the neuron's synapses 104, 104b . . . 104n are each modulated by the synapses' respective weight values 106, 106b . . . 106n. The effect of this process is to pass, or gate, a portion of the input value through the synapse, which is proportional to the value of the weight. In this way, the weight value modulates the connection strength of the synapse. The result is then summed with the other similarly processed input values 110. Using conventional floating point math, the modulating function is preformed by multiplying the signal value by the weight value. It is expressed simply as:

$$r_i = A_i W_i$$

In this formula, for each of the neuron's synapses 'i', '$r_i$' is the result of that synapse's modulating function, "$A_i$" is an axon level (AL), which is the value carried by the axon that is connected to the synapse, and "$W_i$" is the weight value for modulating the input signal at the synapse. In typical neural network configurations, the weight may be negative or positive (often from −1.0 to +1.0). A negative weight value produces a negative result ($r_i$), which will reduce the sum, thereby acting as an inhibitory synapse. A positive weight value will produce a positive result ($r_i$), which will contribute to an increase in the sum of all the results, thereby acting as an excitatory synapse.

Weights are usually adjusted in a separately preformed training procedure to bring the outputs produced in the signal propagation phase closer to a desired response for a given set of input signals. During the learning phase, the neuron is trained using an external learning algorithm 114. A set of input patterns is presented to the neuron or neural network being trained. For neurons at the output of the network, the external learning algorithm produces an error value 116 by comparing the neuron's output to predetermined set of desired outputs (responses) for the pattern. The error value represents the difference between the desired output and the output produced by the neuron. The error value is used to train the weights within the neuron so that the next time the same input pattern is presented to it, the response will be a little closer to the desired response.

Output Functions

Functionally, a typical neuron can be described at a high level of abstraction as a device that accepts multiple input values and processes them to produce a single representative output value. Generally, the output value produced is the sum of all the neuron's inputs, after they have each been multiplied by their respective synapses' weight values. The neuron's output value is then made available for connection to other neurons or processes through its output axon.

The value carried on an axon is sometimes referred to here as an axon level. As mentioned, the single output value produced by a neuron is a weighted sum representation of the values that are connected to the neuron's input synapses through other axons. As the values connected to its inputs change, so will the neuron's single representative output.

At a more practical level, the internally produced sum of a neuron's multiple weighted inputs will be restricted before being output on its axon. Typically, axon levels will be restricted to positive values between 0.0 and 1.0. Floating-point arithmetic is typically used, though other representations, such as percentages, or integer representations are also acceptable. The process of restricting the internal sum of a neuron's weighted inputs is often referred to as a squashing function. It is used to maintain the values produced by neurons to a reasonable range. The neuron's output value (its axon level) can be connected to other neurons where it may then be summed together with other axon levels. These sums can become infinitely large if left to propagate unchecked. It is essential therefore, that the level at the output of each neuron be restricted, limited, or clipped in some way so that it remains in a workable range.

There are a variety of squashing functions that can be used to limit or clip the neuron's output level. Simply clipping the weighted sum of the input values to maximum and minimum values, for example a range of 0.0 to 1.0, is one of the simplest methods. Here, any sums of weighted inputs that exceed 1.0 will be made 1.0, and any sums of weighted inputs that fall below 0.0 will be made 0.0 on the neuron's axon.

This simple clipping technique will work well as long as the levels produced by summing the weighted inputs stay below the level where they will be clipped. Once the internal sum exceeds the clipping maximum, differences in the input signals will not be reflected as a difference on the neuron's output signal. That is, the output will be identical for all input values that cause the weighted sums to exceed the maximum axon level value. Since most weight-training algorithms assume and require that differences in inputs will be represented as differences at the neuron's output, this situation should be avoided.

Most prior-art neural network methods use a sigmoid squashing function as their transfer function. A sigmoid squashing function causes the output value to increase more slowly as its input approaches the maximum allowable level. As the maximum is approached, large increases in the internal sum will produce successively smaller increases in the resulting output value. Near the maximum side of the allowable range, this insures that different input values will be represented as different output values on the neuron's axon (though the differences will be much smaller). Its advantage over simpler schemes is that it provides at least a small amount of representative change in its output as long as the variable has enough resolution to represent it.

The sigmoid squashing function also has benefits for internal sum values near the minimum AL value, which is usually 0.0. In this case, relatively large changes at lower values will produce smaller changes in the output. This may be a benefit in some prior-art designs. On the other hand, it may be desirable to have large changes at lower values to help effect early learning. For this reason, prior-art neurons may sometimes bias the sigmoid function in order to speed learning at lower output levels.

The sigmoid function is computationally intensive, so simpler schemes, such as approximations based on a table lookup are sometimes used. This is especially true in applications where the computational costs of the sigmoid function will tend to outweigh its benefits.

Two Main Phases or Modes of Operation

As discussed above, there are generally two main phases, or modes of functional operation for a neuron. These are a signal propagation mode and a weight adjustment mode. In the signal propagation mode, input stimuli, sometimes called signals or axon levels, are supplied to the neuron, and are processed to produce the single output signal for the neuron. This mode of operation is sometimes referred to as the execution phase or run-time mode of a neural network. The other general operational mode of a neural network is the learning mode, which is sometimes called the weight-training, or weight-adjusting mode. Usually, a neural network is fully trained initially to perform some task, and is then placed into service in its signal propagation mode and no further training commences.

Learning Algorithms

A neuron will map a set of input stimulus or signals to a desired set of output responses for any given set of input signals. A neuron "learns" to respond correctly to a given set of input values by having its weight values adjusted, or trained, by a learning algorithm (114 in FIG. 1). When a neuron or neural network is having its weights adjusted by a learning algorithm, it is said to be in learning mode, or weight-training mode. A learning algorithm is sometimes referred to as a weight training algorithm or just a training algorithm because it is the set of functional methods that are used to "train" weights in the neurons of a neural network.

During this process, the weight values are adjusted higher or lower to bring the neuron's output value X closer to a desired output. The output is predetermined for the specific set of values that are present on the neuron's input synapses. The first step is to produce an error term δ 116 for the neuron i, from which proportional weight changes at the neuron's connection synapses can be calculated. For a neuron i that is directly connected to the output of the network, the error term is simply the difference between the output produced by the neuron $X_i^{actual}$, and the output we desire $X^{desired}$. It is expressed as:

$$\delta_i = X_i^{desired} - X_i^{actual}$$

The error term δ 116 for the neuron is then used to adjust each individual weight value in the neuron in an effort to move the neuron's output closer to its ideal value. How these error terms are applied to adjustments of individual weight values will be discussed in more detail below.

Neural Networks with Hidden Layers

The method of training a neuron in a neural network that has been described above breaks down when there is no direct output connection. That is, neurons in a neural network that connect to other neurons only may contribute to the output, but in ways that are difficult to compute. Such neurons are called hidden neurons because their outputs are hidden "behind" other neurons. Because they are usually configured in networks that use no feedback, they are almost always part of an entire layer of neurons that are hidden. For this reason, related groups of hidden neurons are generally referred to as hidden layers, or hidden slabs.

Back Propagation

Networks that do not permit a neuron's output signal to feed back to any previous or upstream neurons feeding the instant neuron are called feed-forward networks. The distinction is made in the prior art primarily because a family of gradient descent learning algorithms have been developed for feed-forward networks, which propagate error values back to hidden neurons. These algorithms are called back-propagation learning algorithms. The feed-forward neural networks they run on are often classified as back-propagation neural networks. While there are other types of networks, back-propagation networks have experienced considerable success. They have been widely used and are generally well-known.

Back propagation uses a special set of calculations to produce error values 116 for hidden layer neurons. The expression for calculating the error value at a given hidden neuron i may be expressed in terms of the error values that have been calculated at the subsequent (post-synaptic) neurons j to which neuron i is connected, along with the weight value W between the two neurons. The calculation is expressed as:

$$\delta_i = \left[\sum_j \delta_j W_{ij}\right] X_i$$

Note that the output of the neuron for which the error value is being calculated $X_i$ is used in the calculation as well. Here, it represents the result of the output transfer function. It can be seen that the same error value must have been calculated for the neuron of each forward connection $\delta_j$ prior to producing this neuron's error value. This is what restricts back propagation to feed-forward-only networks.

The error value $\delta_i$ calculated for neuron i in the above formula is then incorporated in making the individual weight adjustment calculations. There are a variety of ways the calculated neuron error values are used to adjust the neuron's weights. One example is given by the equation:

$$W_{ij} = W_{ij} + \eta \delta_j A_i$$

Here, i represents the pre-synaptic neuron or process that is connected to the neuron j whose weights are currently being adjusted. In this calculation $W_{ij}$ is the weight value between i and j to be adjusted by the calculation. The weight is adjusted by the neuron's error value $\delta_j$, which is further modulated by the learning rate η determined as part of the learning algorithm. The learning rate is generally used to slow the rate at which the weights are altered so as to reduce the amount each weight adjustment will corrupt weight values that have already been trained on previously learned patterns.

Finally, the individual weight adjustment value is also proportional to the output value produced by the pre-synaptic neuron or process modulated by this weight $A_i$ (i.e., the neuron connecting to the target neuron). If the value on the output of the pre-synaptic neuron is small, the weight adjustment will be small in the target neuron. This particular weight-adjustment method, based on these three factors, is sometimes referred to as the GDR, or generalized delta rule.

Weights Encode Mappings Between Inputs and Desired Responses

Any given weight in a neuron or in a neural network can, and likely will, contribute to a multitude of different trained responses to different input combinations. This characteristic of neural networks is both a strength and a weakness. It is a strength because it allows the neural network to generalize and apply lessons learned, when responding to one set of inputs, to a new set of similar inputs. That is, if the network has learned a desired output for one set of inputs, and it is then presented with a set of inputs that are almost, but not quite, identical, it will produce an output that is conceptually similar to the output it learned in response to the training set.

A neuron's use of the same set of weight values to encode multiple responses doesn't necessarily eliminate its ability to discern two very similar input vectors that require very different responses. It does make such discernment difficult though, requiring more and more resolution, or bit width from the variables used to hold weight values. In this case is the small number of inputs that differ between the two sets of inputs will be responsible for all the difference in the output value. In other words, the weights for the inputs that aren't common to both sets of inputs will be adjusted deeply to compensate for the values produced by the weight calculations preformed on the common inputs. From this it can be seen that the ability of a neural network to discern between similar input sets is directly related to the dynamic range of the weight values.

How Neurons are Used

As stated, a neuron is the primary component in a neural network. To preform a useful task, a typical neural network may be composed of tens of thousands, or even millions of individual neurons connected together in a variety of ways and trained. Information is represented in a neural network according to the strengths of the connections between the individual neurons comprising the network. Connection strengths between neurons are represented by the weight values at each neuron's input synapses. Information is represented in these connection strengths between each neuron in a highly distributed way across all, or at least many, of the neurons and connections making up the neural network.

One typical example application of neural networks is in optical character recognition. In such a neural network printed characters are scanned in and represented as an array of pixel values to be used as inputs. Internally after training this neural network, connection strengths may end up adjusted such that one or more hidden neurons are activated whenever a set of pixels having a single horizontal line are present (such as for 'A', 'H', 'L', or 'T'). Another internal neuron may end up representing letters in which two lines are connected by a single horizontal line ('A' or 'H'). Yet another hidden neuron may end up representing letters with vertical slanted lines that come together with other lines ('A', 'K', 'M', 'N', 'V', 'W', 'X', 'Y', or 'Z'). On the other hand, the trained network may end up representing the various attributes and features found in the input pixels completely differently.

How the neural network ends up representing the various letters within its connection weights between neurons may not be specified or known by those designing and training the network. In many instances, only representations of the trained input patterns to the network, and the desired output from the network for each of those input patterns, are known and presented by the trainer. How the network produces those desired responses, and how that information is represented internally by the connections within the neural network, is a product of many factors. Such factors include the initial neural network structure, the informational structure of the training data, the initial weight values, the training algorithm and learning rate used, small random changes made to weights as the network is trained, the order that the training set is presented to the network, and any imperfections in the training set that may be presented during training Some Prior-Art Neurons Employ Multiple Weights for Each Connection Some prior-art neurons employ multiple weights for each connection. Some use two weights to allow a decision as to which is the better trained weight. This is primarily a technique for avoiding local minima, a problem encountered in some weight adjustment methods, such as back-propagation. It can also be used to help determine when the network is optimally trained, so that the trainer will know the best time to terminate training. In prior-art neurons, everything learned is generally permanent, so knowing when to stop training is a real concern. An example of this type of usage can be found in U.S. Pat. No. 4,918,618 to Tomlinson, Jr., issued 11 Apr. 1990.

Another prior-art device that stores multiple weights for each connection can be found in U.S. Pat. No. 5,671,337 to Yoshihara, issued 23 Sep. 1997. Yoshihara's input signals are modulated by multiplying them by a single weight value when the neuron is in signal propagation phase, just as in more conventional neurons. The single representative weight used for modulating the input value is either selected, or derived, from the set of weights stored for each connection. It is then used conventionally as the single weight value by which a given input signal is multiplied for propagation (see the discussion on weights above). In some embodiments, the single weight is selected from the set of weights for the connection synapse, based on the magnitude of the signal at the input for which the weight is being selected. Other embodiments use the set of weights as parameters for a stored function, which itself produces a single weight value. In any case, the single weight value produced is then multiplied by the input signal in conventional fashion. It is also important to note that learning is performed with any number of conventional learning algorithms which, once chosen, are applied to all the weights without differences in learning rates or algorithm. Back propagation is the exemplary method within these embodiments. Importantly, in every embodiment, all weights are adjusted by the same learning algorithm and learning rate.

Separate Sub-Networks have Provided Responses for Different Short-Term Adaptation Needs.

An interesting technique for accommodating some of the problems prior-art ANNs encounter in dealing with minute-by-minute details is presented in a paper by Charles Hand to NASA's Jet Propulsion Laboratory, Hand, Improved Autoassociative Neural Networks, JPL New Technology Report NPO-21224, October 2003, Jet Propulsion Laboratory, Pasadena, Calif. A hexapod robot is shown to have a need to be trained with different walking gaits depending upon its circumstances. This was done using a dynamically selectable sub-network, which was selected based on which walking gait was required of the hexapod robot at the moment. The sub-networks, were built with binary (1-bit) weights that made them simple. More environmental moment-by-moment walking gait details could be stored in Hand's network by adding and training more sub-networks for each new walking gait that might be needed. Hand demonstrates a smart technique to work around a shortcoming of current neural network technology. Hand also helps to demonstrate a need for a neural network employing a neuron which is able to overcome this shortcoming by specifying a means of storing long-term general information separately from short-term, moment-by-moment response adaptations.

Learning is Usually Permanent in Prior-Art Neural Networks

Most current neurons used in artificial neural networks have no means for explicitly forgetting anything. For this reason they must have noise-free training data or the weight memory will become corrupted with the accumulated effects of learned noise that will never be forgotten. Also, current neurons can not continue to learn once trained, because new lessons will increasingly interfere with and corrupt previously learned information. For these reasons, a typical neural network is trained on a given set of pristine, representative input patterns, and is then put in service. Training does not normally continue once the initial set of training patterns have been presented and learned.

Learning Must Commence at Slow Pace in Prior-Art Neurons

To train existing neural networks, sets of signals representing desired exemplary input patterns, are usually successively applied to the primary inputs and allowed to propagate through the neural network to the output, this has been referred to here as the signal propagation phase. The differences between the actual and desired output values, determined by an external teacher, are then calculated to arrive at an error signal for each neuron. The calculated error is then used to adjust the neuron's synapse weights.

The process of presenting exemplary patterns and training toward a desired output is repeated in a recurring manner and typically requires a large number of iterations to reduce errors appearing at the primary outputs to an acceptable level.

Adjustments need to be made slowly because, as input patterns are trained, every weight adjustment will adversely affect the weight adjustments performed previously for all other patterns. The weights contain both the detailed information for dictating the neuron's moment-by-moment responses within the same set of weights where generalized response information is stored. Thus they will tend to interfere with each other as the set of training patterns is repeatedly presented. If the weights are adjusted too much on one training pattern, the changes to weights caused by the current training pattern will completely eliminate all the prior weight adjustments performed for one or more previously adjusted sets of inputs and outputs.

Continuous Adaptation and Learning is Very Difficult to Achieve Using Prior-Art Neurons.

Because the weight training is usually permanent, everything neurons learn while in training mode must remain in them indefinitely. Both long-term generalized knowledge, as well as short-term, moment-by-moment specifics for a given task, are all stored together. Even if weights with huge dynamic resolution are used, attempting to keep small moment-by-moment details in the same conceptual memory space as the more generalized information will eventually lead to loss of information. The generalized information will be lost to the details of the moment. Also, the ability to learn new details will be adversely affected by old details that are no longer needed, even if those details occurred many days, weeks, or even years earlier.

Ability to Train Neurons Based on Reward-Punishment Schemes is Poorly Supported

Most neural network learning algorithms in use today don't permit simple reward-punishment learning schemes to be used. Much work has been done to find ways to train neurons based on reward-and-punishment cues for a variety of reasons. One advantage is that such a training scheme would mimic much of what is known about how autonomous learning occurs in biological organisms, Levitan, Kaczmarek, "The Neuron, Cell And Molecular Biology", 2002, Oxford University Press, ISBN: 0-19-514523-2. Learning based on noisy learning signals, such as reward-and-punishment cues from the environment, will also help greatly in producing systems that continuously adapt to their surroundings.

Weight Adjustments to Adapt Short-Term Responses could not be Explicitly Performed without Affecting Existing Learning As stated, one of the primary disadvantages of conventional neural networks is that they usually must be taught to handle all possible situations ahead of time. That is, the effect of training is to adjust weights to values that are best for most patterns that may be encountered by the network. At the end of the training process, all weights are fixed to reflect the general desired responses to the set of training patterns.

On one hand, the weights must be trained in enough detail so that a detailed and correct response can be made to any novel (unplanned) sets of stimuli encountered by the running neural network. However, the weights must not be trained so specifically that needed general information is lost. In other words, training the same set of weights to respond specifically necessarily corrupts the neuron's ability to respond acceptably to many different broader classes.

Hypothetical Car-Driving ANN Example

Consider the construction an artificial neural network (ANN) for driving a car as a hypothetical example of an application of neural networks. This is an important application where neural networks may eventually be able to help. A variety of methods of automatically and autonomously driving vehicles are beginning to be explored at this time, "Autonomous Ground Vehicle Grand Challenges", 2004-2006, DARPA—The Defense Advanced Research Projects Agency, http://www.darpa.mil/grandchallenge/overview.asp. Attempts to use neural networks in these endeavors has met with only limited success.

The hypothetical application of a neural network to this application will demonstrate some of the problems with current neural networks constructed with current neurons. Current neuron models allow ANN designers to produce a neural network that can be trained to drive a car in general, placing that general knowledge in long-term (actually permanent) memory. Such generalized, long-term driving lessons might include all the basics, such as steering, breaking, acceleration (gas), clutch and gear-shifting, among other general driving knowledge.

If, after having trained such an ANN in the basics, the ANN and its car are placed into anything other than a very generic driving situation, it will not work. Whether it's for driving a car, or for any other context, this inability to change once trained, in order to adapt to new moment-by-moment situations, is an inherent limitation of current ANN technology.

In this hypothetical car driving example, new moment-by-moment adaptation needs might include city driving, highway driving, off-road mountain terrain, off-road beach terrain, and finally, night-driving for each of these previously experienced and learned situations, respectively. Here the general learning is stored in weights that are trained slowly but hold their learned information for very long periods. That is, general driving instructions are maintained as long-term memories. One problem with present-day neurons is that the short-term, detailed responses needed for driving variations must be permanently represented in the same set of weights used to store the general driving information. One notable disadvantage of this strategy is that the weights holding long-term responses become corrupted with values used to produce responses to short-term details.

Thus it can be seen that the structure of long- and short-term learning will often be very different. By attempting to maintain both of these types of learning within a single set of connection weights prior art neurons will have great difficulty learning short-term, detailed responses without adversely affecting the long-term learning that is represented in the same set of connection weights. The usual solution is to simply forbid continuous learning, shutting off learning once a given set of responses have been learned. In these cases, both short- and long-term responses will all be represented within the single permanent set of weights, requiring weight variables with considerable resolution and eliminating any ability of the trained neural network to adapt to new short-term details that weren't included within the original training.

SUMMARY

A neuron is a processing unit that mimics some of the known functionality of a brain cell and is used in the construction of neural networks. Neural networks are parallel processing networks composed of neurons connected together in a variety of topologies, that seek to mimic cognitive brain functions. According to one aspect, a neuron is presented that provides means of storing long and short-term response memories within separate but related synapse weights.

This is accomplished in one or more aspects by providing multiple synapse weights for each connection to a neuron. Each connection has the capability to learn at a rate that is distinct from the other respective weights in the same synapse connection. This provides synapse weights with multiple distinct acquisition times within a given synapse. A forget means allows each synapse weight to be configured to forget its learned values at a distinct forget rate. Such forget means imparts different retention times for each synapse weight. Finally, a given synapse weight within a given synapse can learn from one or more of the other weights in the same synapse.

By separating learning into two or more different categories, based on differences in the lengths of acquisition and retention times, these neurons, in one or more aspects, provide a variety of practical benefits over the prior-art single, permanent, weight retention time. In many cases, these two categories of learned responses are represented by information of very different structures.

DRAWINGS

Figures

REFERENCE NUMERALS

Figure 1:
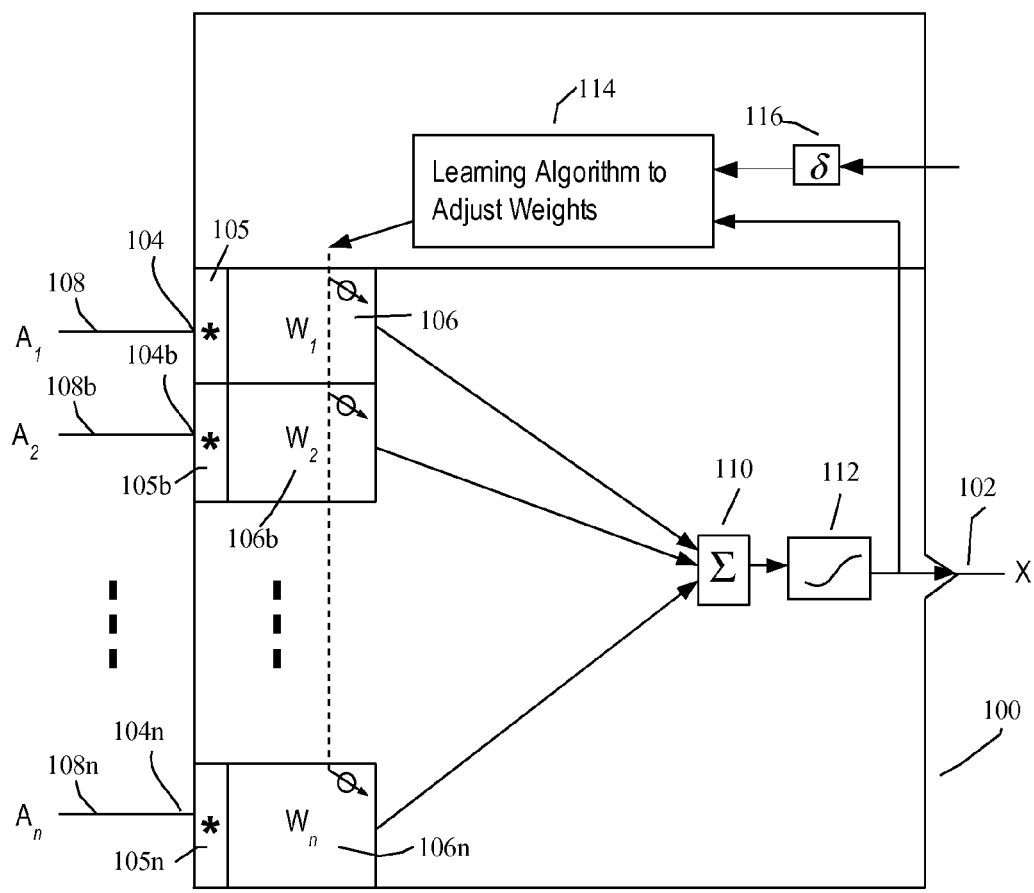
FIG. 1 is a schematic diagram of a prior-art neuron used in ANNs, an artificial processing unit that mimics some of the known processing mechanisms found in biological neurons.

100—Schematic depiction of a prior-art artificial neuron.
102—Schematic depiction of an axon conveying the output value (X) produced by a neuron, making it available for connection to other neurons and processes.
104—Synapse, or connection means providing a logical or physical means to connect an axon and its conveyed value to a neuron.
105—Synapse modulating means, which modulates the value at the input of a neuron by the value of a single weight stored, selected, or derived, for the synapse.
106—Weight value, according to the prior-art, which is used to modulate a value present on the synapse of the neuron by a single stored, selected, or derived, weight value.
108—Schematic depiction of an axon conveying an input value ($A_i$) to the neuron.
110—Summing function that sums the results of preceding modulating operations within the neuron together.
112—Transfer function performed against the neuron's internal sum in order to restrict the output of the neuron to a predetermined maximum range.
114—Weight adjustment facility to act on the weights of a prior-art neuron.
116—Error value, or set of error values and functions used to produce an error for an entire neuron.
200—Neuron according to the first embodiment.
204—Synapse connection means.
205—Synapse modulating means for neurons of the embodiments.
206-1, 206-2, 206-3—Multiple weights associated with a single synapse.
214—Weight adjustment facility for the neuron of the first embodiment.
216—Error value facility responsible for producing a neuron-level error value for a given synapse weight.
300—Start of the steps to process signal propagation in one synapse of first embodiment.
302 through 312—Loop-through process steps for signal propagation for each weight in a synapse of first embodiment.
314—End of steps to process signal propagation for one synapse of first embodiment.
400—Beginning signal propagation processing steps for one neuron of first embodiment.
402 through 408—Loop-through process steps for each synapse for signal propagation for one neuron of first embodiment.
410—Transfer function for signal propagation for one neuron of first embodiment.
412—End of steps to process signal propagation for one neuron of first embodiment
500—Beginning steps to process weight training (learning) adjustments for one synapse of a neuron.
502 through 526—Loop-through process steps for weight learning adjustments for each weight in a synapse of the disclosed embodiments.
528—End of process steps for weight learning adjustments for one synapse of a neuron.
600—Beginning process steps used to perform learning adjustments for a neuron.

602 through 608—Loop-through neuron level learning calculations performed once for each synapse weight for the neuron.
610 through 616—Loop-through steps performed for weight learning adjustments for each synapse in a neuron.
618—End process steps used to perform learning adjustments to weights for a neuron.
700—Beginning process steps for preforming weight-to-weight learning adjustments to a single weight in a single synapse of neuron.
702 through 720—Loop-through steps to obtain predetermined portions of each weight value to provide an adjustment factor for weight-to-weight weight adjustments.
722 through 728—Adjust a single weight within a single synapse of a neuron.
730—End process steps for preforming weight-to-weight learning adjustments to a single weight in a single synapse of a neuron.
800—Beginning process steps to perform weight forget adjustments for weights in one synapse of a neuron.
802 through 828—Loop-through the steps to apply weight forget adjustments for each weight in a synapse of a neuron.
830—End process steps to perform weight forget adjustments for weights in one synapse of a neuron.
900—Begin process steps to perform weight forget adjustments for the weights in a neuron.
902 through 908—Loop-through the process steps to apply weight forget adjustments for each synapse of a neuron.
910—End process steps to perform weight forget adjustments for the weights in a neuron.
1000—Neuron according to the second embodiment.
1018—Weighted sums of inputs from each of the two weights within each synapse in neuron of the second embodiment.
1020—Transfer function that is applied to weighted sum of inputs for a single set of synapse weights for neuron of second embodiment.
1022—Modulating means that modulates a predetermined portion of each of the weighted sums for each of the two weights to neuron's output sum for neuron of second embodiment.
1100—Beginning process steps to perform typical training procedure for neuron.
1102—Initialize training variables
1104 through 1122—Loop-through steps for performing one training set of a typical training procedure for a neuron.
1124—Determine if another training set is required.
1126—End process steps to perform a typical training procedure for a neuron.
1200—Beginning steps to process signal propagation for one synapse of a neuron of the second embodiment.
1204, 1210—Loop-through process steps for signal propagation for each weight in each synapse in neuron of second embodiment
1214—End steps to process signal propagation for one synapse of a neuron of second embodiment.
1300—Beginning steps to process signal propagation for a neuron of second embodiment.
1302 through 1308—Initialize neuron sum and loop-through steps to initialize the sum for each weight (the weight sums) of neuron of second embodiment.
1310 through 1316—Loop-through steps to process a synapse for each synapse in a neuron of second embodiment.
1318 through 1326—Loop-through steps to modulate predetermined portion of weight sums and perform transfer functions for neuron of second embodiment.
1328—Perform a transfer function on the neuron's output sum and make the result available on the neuron's output.

GLOSSARY

Acquisition Time, Memory Acquisition Time, Learning Acquisition Time—In both biological, and artificial neurons the amount of time it takes for a response to a new experience to be learned. In prior-art ANNs and here, it is roughly determined by the learning rate configured for the learning algorithm used to adjust the weight. The neurons of this embodiment define multiple weights called synapse weights for each synapse. Each synapse weight can have its own acquisition time based on the learning algorithm and learning rate for which each is configured.
ANN—Artificial Neural Network.
Axon—A means of conveying signals produced and used by neurons to and from other neurons. In ANNs and biological nervous systems signals conveyed on axons may also be conveyed between neurons and external processes, such as motors, muscles, and sensors. In biological neurons, axons carry signals between neurons, and to and from motor and sensory feedback mechanisms within the organism.
Connection Means—A means of conveying an input value to the input synapse of a neuron, or of conveying a neuron's output value to external processes, or to the input synapses of other neurons. In neurons constructed with discrete hardware, this may be a terminal or solder connection to or from another neuron. In neurons constructed in software this may be a simple memory pointer containing the address where the value to be connected is stored.
δ (delta)—Used to represent the neuron level error value generated by the learning algorithm. In the neurons described in the embodiments there may be a separate learning algorithm and neuron level error value for each synapse weight. The neuron level error value is, in turn, used as a factor when making individual weight adjustments
η (eta)—Used to represent the learning rate in individual weight adjustments. In the neurons described in the embodiments there may be a separate learning rate for each synapse weight.
Excitatory Input, Excitatory Synapse—In biological neurons this is a synapse that, when stimulated by an input signal, tends to increase the likelihood that the neuron will fire. In artificial neurons, input signals connected to an excitatory synapse will tend to increase the output value produced by the neuron. Such excitatory behavior is usually accomplished in artificial neurons by modulating the input signal by a positive weight value. See also: Inhibitory Input.
External Process, Outside Source—In this embodiment, this is used to denote processes that provide sensory information to a neuron, or that can be affected by the output of a neuron. Examples of external processes may include such things as actuators, indicators, communications, data storage and analysis systems, and other processes which may use the output, or provide the input, that is respectively produced and used by a neuron in a neural network.
Forget Process, Forget Means—A method by which one or more weights associated with each synapse of the disclosed embodiments is moved closer to zero over time.
Forget Rate—The rate at which one or more weights of the present embodiments is moved closer to zero over time. See Forget Process.
Gate—Occasionally used here and in biological descriptions of synapse processes to describe the process of modulating, or gating, an input value on a synapse by a weight or connection strength value. The result is a portion of the input value that is determined by the weight value. This is sometimes referred to as gating because conceptually, the weight value determines the magnitude of the signal value that passes, and in which direction (the weight can be positive or negative). Expressed in floating point math, it is synonymous with the process of multiplying the input value connected to the synapse, by the weight value associated with the synapse. In this way, the weight value determines the conceptual connection strength of each value connected to the neuron's inputs. Because the weight values can usually be positive or negative, it also determines if the input is excitatory (positive weight value) or inhibitory (negative weight value). The biological processes responsible for modulating the connection strength to a neuron are often referred to as gating in biological studies of synapse processes in neurons. In biological synapses, such gating modulates the strengths of connected signals by permitting varying amounts of neuro-transmitters to pass in and out of the neuron, based on how far (or more accurately for biological cells, how often) it is conceptually opened or closed (Levitan, Kaczmarek, "The Neuron, Cell And Molecular Biology", 2002, Oxford University Press, ISBN: 0-19-514523-2). Purely mathematical simulations usually refer to this as a multiplication because it has become customary to talk about such neural network models in terms of functions preformed using floating point arithmetic. See Modulate.

Inhibitory Input, Inhibitory Synapse—In biological neurons this is a synapse that, when stimulated by an input signal, tends to reduce the likelihood that the neuron will fire. In artificial neurons, input signals connected to an inhibitory synapse will tend to reduce the output value produced by the neuron. Such inhibitory behavior is usually accomplished in artificial neurons by modulating the input signal by a negative weight value. See Excitatory Input.

Internal Sum—A sum of weighted inputs produced by a neuron prior to being processed by a transfer function for output. This is further limited in the embodiments of the disclosure to a predetermined portion of the weighted sum from each synapse weight. This is sometimes just called the sum, or the neuron sum. It may also be referred to as Neron Sum in flow charts, and xSum in source code. At least one embodiment of the disclosure presents a neuron in which the respective results from each synapse weight's calculation is accumulated into a separate sum for the synapse weight. Each synapse weight sum is then further summed together to produce the internal sum defined here.

Learning—The process of adjusting weight values to bring a neurons response closer to a desired response for a given set of inputs.

Learning Algorithm, Learning Method—A part of the weight-adjustment facilities. A set of functions and processes used to adjust the weights of a neuron or neural network closer to a desired output, so that they produce less output error the next time a similar set of inputs is presented. In the disclosed embodiments, multiple synapse weights can each be configured to have their own weight-adjustment facility, containing a distinct learning algorithm.

Learning Rate—A value used by the learning algorithm to determine how quickly the weights are adjusted. It determines the acquisition time for weights trained using the algorithm.

Local Minima—A state that a learning neural network sometimes gets into, where the weight adjustments for one or more training patterns simply offset the adjustments performed for a previously trained pattern. The previously trained pattern is not in its ideal desired output mapping, but is stuck in a less than ideal "local" response mapping, referred to as a local minima. This state can sometimes be avoided by jogging the connection weights (see Weight Jogging).

Long-Term Memory, Long-Term Learning, Long-Term Weight—Refers here to connection weight values that are retained for a relatively long time. In biological neural networks long-term and short-term memory are believed to use different molecular mechanisms. Retention times for long-term memory may last for hours, days, months, or even the life of the organism. The disclosed embodiments provide weights that can be set to retain their learned values for long periods, or permanently, by configuring the weights to forget at a very slow rate, or not at all. See also: Retention Time, and Short-Term Memory.

Modulate, Modulation—Used to describe how a signal value is modified by a weight value in a synapse. It is a synonym for the word gate as it is used here, and roughly synonymous for the word gate as it is used to describe biological synapse functions. Expressed in floating point arithmetic, it is simply the signal value multiplied by the weight value. For this reason the word multiply is also sometimes used as a synonym for modulate. See Gate Modulating Means—A means for modulating one value by another value. Expressed in conventional floating point arithmetic, it is simply a multiplication of the two values.

Neural Network—A network of connected neurons. See Neuron.

Neuron—Also known as a neurode, or artificial neuron, or processing unit when used in the context of an ANN. In essence, a neuron's primary function is to receive a multitude of input signals that are connected to its synapses from external sources, or from other neurons in a neural network, and produce an output signal. A typical neuron produces a single output value that represents the weighted combination of the values on its inputs. It can be connected to the inputs of other neurons or to outside processes. The synapses modulate, or gate, the input signals connected to them by weight values before combining them with the neuron's output. In floating point math, the input values are simply multiplied by the weight values to gate them. Because these weight values can be adjusted in response to stimuli, the output represented on the neuron's axon is further modified by changes the weight values undergo during training In biological nervous systems, a neuron is a single cell with exaggerated signaling capabilities. In neural networks a neuron is a process element that mimics some aspects and characteristics of a biological neuron. In essence, a neuron, whether biological or simulated, comprises inputs called synapses that connect signals from other neurons, and outputs called axons, which carry the neuron's output signals to other neurons.

Neuron Error, Neuron Level Error—An error value, produced for the neuron, to be used in the calculations that adjust the individual weights of the neuron. In the embodiments described, each synapse can have multiple weights, and there can be a separately produced neuron error for each synapse weight.

Retention Time, Memory-Retention Time, Learning-Retention Time—In biological neural networks the amount of time a learned response remains within a neuron, synapse, or network of neurons. The amount of time a given synapse weight will retain its learned value. Different learning retention times are accommodated through a weight forget adjustment means (see forget process), which is configured to move the weight value towards zero at a configurable rate called the forget rate. If the forget rate is fast, or high, the weight is said to have a short retention time and holds short-term memory. If the forget rate is slow or zero, the weight is said to have long retention time and holds long-term memory.

Short-Term Memory, Short-Term Learning, Short-Term Weight—Connection weight values that are retained for a relatively short time. In biological neural networks long-term and short-term memory are believed to use different molecular mechanisms. Retention times for short-term memory are usually short. They may last for fractions of a second up to a minute or two. The disclosed embodiments provide weights that can be set to retain their learned values for relatively short periods, by configuring the synapse weights to forget at a relatively fast rate. See also Retention Time and Long-Term Memory.

Synapse—An umbrella term for a part of a neuron that acts as a signal input to a neuron. A synapse encompasses a method of connecting an outside signal to the neuron, and the means of modulating the input signal by a weight value along with the weight or weights used by that modulation means. At a high level of abstraction, a synapse is a point at which communication occurs between a neuron and another neuron or external process. In biological neurons a synapse is a physical interface between a pre-synaptic neuron's output axon (or an axon from a sensory system), and an area on the surface membrane of a post synaptic neuron. The synapse is where chemical and electrical signals invoked by the pre-synaptic neuron can produce an effect on the post synaptic neuron's output axon.

In the artificial neurons of these embodiments, a synapse contains a connection means (a way to reference or connect a value generated by an external source), a multitude of weights, and a means of using the value of the weights to modulate the incoming signals. A synapse logically resides at the connection point between an external pre-synaptic signal source (such as another neuron or external process) and the post-synaptic neuron.

Like its biological counterpart it modulates the strength of incoming signals and determines if they will have an inhibitory or excitatory effect on the post-synaptic neuron. For this reason a synapse is sometimes broadly referred to as a connection. In a stricter sense it is a connection point and a set of processes that exist at the point of connection. In the case of biological neurons, the processes are electro-chemical and may include, for example, membrane proteins that act as pores that selectively gate, or allow, a variety of ions to enter and exit the neuron when stimulated by a signal.

In the artificial neurons of these embodiments, a synapse contains a multitude of weights, and a modulating means which serves to modulate the strength of any signal connected to the neuron. This effectively modulates the strength of the input connection between the pre-synaptic process and the post-synaptic neuron.

Synapse Weight, Synaptic Weight—In prior-art ANNs, a single value used to determine (or weight) the strength of an input signal at a synapse to be passed to the neuron's sum. The result is a portion of the input value that is a function of the weight value. Expressed in floating point, the input value connected to the synapse is multiplied by the weight value. In the disclosed embodiments, a synapse weight is one of multiple weight values associated with each synapse. Each synapse weight is multiplied by the single value connected to the synapse. This acts as a gate, modulating the amount of the input value to be accumulated in the neuron's sum. A synapse weight may refer to a set of weights containing all the same weight number from all the synapses comprising a given neuron. In other words, if synapses are configured to have three weights, W1, W2, and W3, then synapse weight 1, or the first synapse weight, may be used to describe the first weight (W1) in all the synapses (inputs) in the neuron.

Weight, Weight Value—A value used to modulate, or gate a single input signal to a neuron during signal propagation phase. Expressed in floating-point arithmetic, the value of the input signal is multiplied by the weight value to produce a result. The result of the multiplication is then summed by the neuron. During training or learning phase, weight values are changed in order to bring each neuron's output response in line with a desired response for a given set of inputs. See Synapse Weight Weight-Adjustment Facility, Weight-Adjustment Means—An umbrella term encompassing anything that alters the value of a weight. This includes learning algorithms, the forget process described here, and weight jogging methods.

Weighted Sum—The sum of all the input values connected to a neuron after being modulated by the weight values associated with their respective synapses.

Weight Jogging—A method of slightly altering each weight in a neuron by a small randomly generated amount while training, in an attempt to avoid local minima.

Weight Sum—A sum which is produced and maintained for each synapse weight as documented in the second embodiment. The neurons of this disclosure provide multiple weights for each synapse connection that are each used to modulate the input value connected to their respective synapse. In the second embodiment, the results of multiplying the input value by each synapse weight is added to a sum just for that synapse weight. In other words, this is a weighted sum for one of the multiple weights comprising each synapse in the second embodiment.

Weight-To-Weight, Weight-To-Weight Learning, Weight-To-Weight Adjustment, Weight-To-Weight Training—A method described in the embodiments of adjusting the weights of a neuron. It adjusts the value of one synapse weight in a synapse, using the value of one or more other weights in the same synapse.

DETAILED DESCRIPTION

FIGS. 2-9, and 11

First Embodiment

As in a prior-art neuron, the neurons disclosed in these embodiments each receive multiple input values and produce a single output. A neuron's multiple inputs convey signals, or values, to the neuron via connections to its synapses from external processes or from other neurons. Its single output, in turn, is used to convey the result of the neuron's processing of inputs to other neurons and to external processes. External processes can be displays, storage devices, sensors, motors, or any other device that one may desire to control with, or use as input to, a neuron or neural network.

A neuron unit according to the first embodiment uses multiple weights for each input connection or synapse. It enables each weight within a synapse to be adjusted at a different respective rate, and with a different respective learning algorithm from the other weights in the same synapse. Means are provided to train one synapse weight using the value of other weights in the same connection synapse. This method is called weight-to-weight learning, weight-to-weight training, or weight-to-weight adjustment.

The embodiment also employs means to modulate, or multiply the single value on an input by the multiple weight values in a given connection synapse. A means for continuously and independently adjusting weights towards zero at a specifiable rate is provided. The rate at which weights are set to forget is referred to as a forget rate. The weight reduction, or "forget" process it controls is made practical because it allows some weights in a given set of synapses to learn and forget adaptations needed for the moment relatively quickly, while providing slower-changing weights in the same respective synapses for maintaining longer-term memories.

Figure 2:
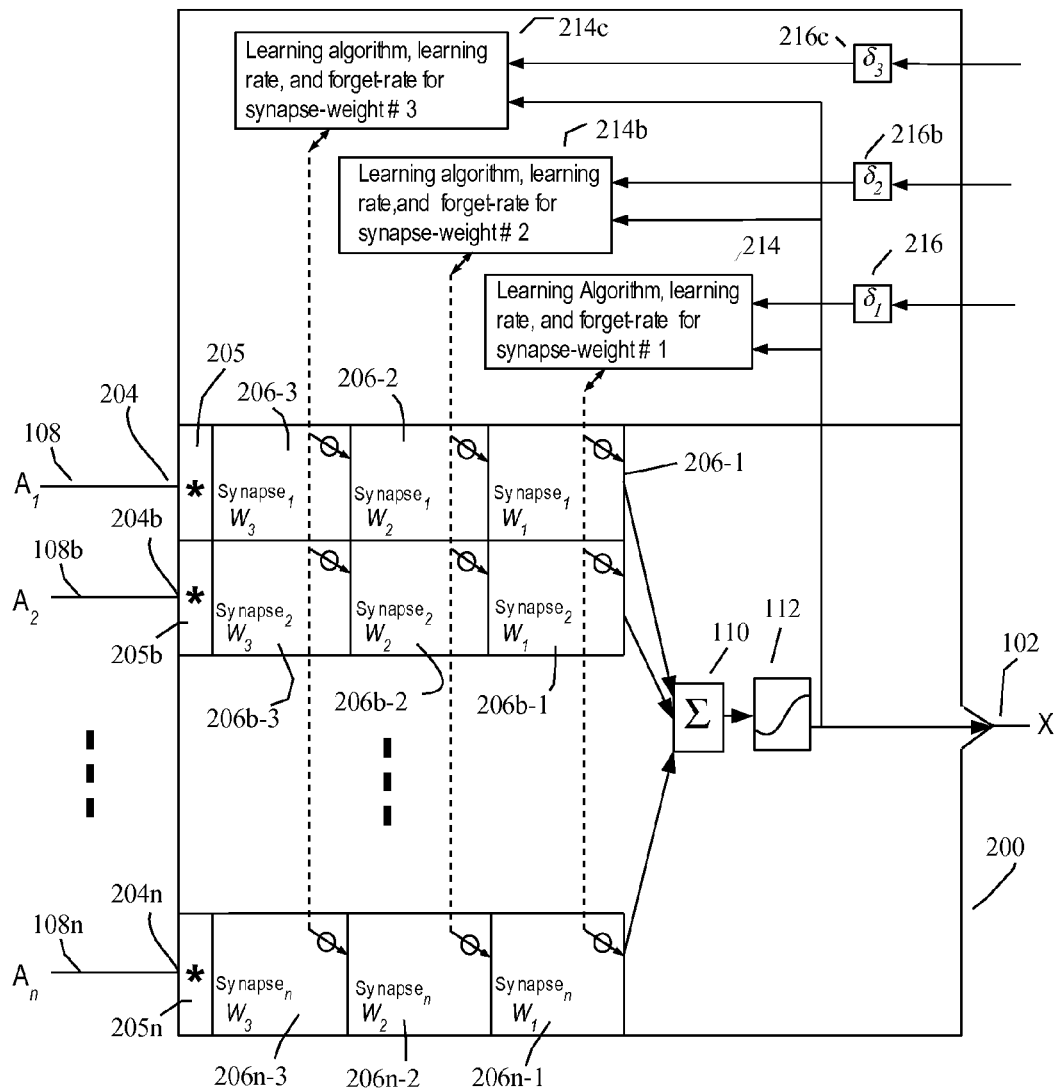
FIG. 2 is a schematic diagram of one embodiment of a neuron that includes signal propagation parts and weight adjustment facilities, showing relationships between them.

Neuron Structure—FIG. 2

Some of the differences between the structure of a prior-art neuron, and a neuron of the disclosed embodiments can be readily seen by comparing the diagram of a new neuron embodiment in FIG. 2 with the diagram of a typical prior-art neuron in FIG. 1.

In FIG. 2 each input value, or signal (labeled $A_1 \ldots A_n$) is conveyed through a respective synapse $204$, $204b \ldots 204n$, via a respective axon $108$, $108b \ldots 108n$. The axon shown schematically may represent a wire or trace, or it may simply represent the function of a memory pointer and its relationship to an externally stored value it references. The input connections are conventional and their characteristics will depend upon the technology used to construct neuron unit $100$. In a neuron constructed in hardware, for example, the input connections to synapses $204 \ldots 204n$ may be hardware terminals connecting the medium used to convey the input signal to the neuron. In this case the medium can be an electrical wire, a printed circuit trace, or a fiber optic strand, for example. In a neuron constructed in software, the input connection to the synapse preferably is a software pointer, i.e., a reference to a memory location that contains the input value. Axons $108 \ldots 108n$ depict this conveyance medium. When the neurons and neural networks are constructed in software so that the connection means is a pointer to a memory location, axons are not used.

Taking a single synapse $204$ from FIG. 2 as a representative example, each synapse includes three input weights $206$-$1$, $206$-$2$, and $206$-$3$ containing weight values $W_1$, $W_2$, and $W_3$ respectively. Modulating means $205$, $205b \ldots 205n$ individually modulate, or gate, each input value $A_1 \ldots An$, by each of the multiple weight values associated with a given synapse. Such modulating means are depicted schematically as a star at the junction of the axon and the synapse in FIG. 2 and are functionally a component of each of synapses $204 \ldots 204n$. One main difference of the synapses from the prior-art is that the input signal is modulated by each of the multiple weights (in this case three) individually to produce multiple results that are each passed to the neuron summing function. Each input value to a given synapse will be used in three separate multiplication calculations producing three separate result values, once for each weight within the synapse.

Once the three result values produced by the modulating means of the synapse have been calculated, a pre-configured portion of each result value is passed on to neuron summing function $110$. Once a sum of all the inputs is gated, or multiplied, by all their respective weights, the neuron's remaining signal propagation function is constructed similarly to a typical prior-art neuron. The calculated sum is passed through a transfer function, typically a sigmoid squashing function $112$, and then is made available as a value (denoted with an X in FIG. 2) on the neuron's output axon $102$. The value produced by the neuron, and the values that can be presented to the neuron on its inputs $108$, $108b \ldots 108n$ have identical characteristics and are often referred to as axon levels.

An even sharper departure from prior-art can be observed in the structure of the learning, or weight training, or weight adjusting facilities $214$, $214b$, and $214c$. Each of multiple weights $206$-$1$, $206$-$2$, and $206$-$3$ associated with each synapse $204$, $204b \ldots 204n$ can be configured to have its own learning algorithm and respective learning rate $214$, $214b$, and $214c$. Each synapse has three weights associated with it and three learning algorithms and learning rates are predetermined, one for each weight.

A separate weight-reduction facility, called a forget function, or forget means, is individually configured for each of the weights (three in the presently described embodiment) associated with each synapse. The rate at which the weights are reduced can be configured for each individual weight in a synapse. This is also represented in the schematic diagram of FIG. 2 as part of weight adjusting apparatus $214$, $214b$, and $214c$.

Most conventional learning algorithms calculate an error value for the entire neuron. Because the neuron may comprise a different learning algorithm and learning rate for each of the weights associated with a given synapse, multiple neuron-level error values are provided. In the case of the presently described embodiment, there are three weights for each of synapses $206$-$1$, $206$-$2$, and $206$-$3$. Each weight has its own weight adjustment means $214$, $214b$, and $214c$ comprised of a learning algorithm, a learning rate, and a forget rate. Finally, each of the three learning algorithms may compute its own neuron-level error values $216$, $216b$, and $216c$ for the neuron. The neuron level error value is used by many learning algorithms to determine how much to adjust each individual weight that it trains.

In one aspect a weight training method, called weight-to-weight learning, can be used to produce and use a neuron-level error value, but that can also work without such a value.

Operation—FIGS. 2-9 and 11

When discussing neuron functions it is customary to use floating point numbers in the range of 0.0 to 1.0 for values of axon levels, and floating point numbers in the range of −1.0 to +1.0 for weight values. Other representations, such as integer values in predefined ranges, can also be used as well with proper scaling and processing. Floating-point number representations make modulating, or gating calculations easier to depict because a simple multiplication can be performed to obtain a ratio of the signals modulated (or multiplied) by a weight value. For these reasons, unless specifically noted otherwise, floating-point representations will be used in these discussions. Other representations, such as use of integers within predetermined ranges may be used with proper scaling and adaptation.

The neuron has three main modes or phases of operation. One is the signal propagation phase, or non-learning phase. It is sometimes called the execution phase, or run-time, in the prior-art. The second phase is here called the weight-adjustment phase, and is sometimes called the learning phase, or weight-training phase. The third operation mode is unique and is the forget phase. The forget and learning phases can be thought of as being sub-parts of the more general weight-adjusting facilities $214$, $214b$, and $214c$ along with their neuron level error calculation facilities $216$, $216b$, and $216c$ in FIG. 2.

Figure 3:
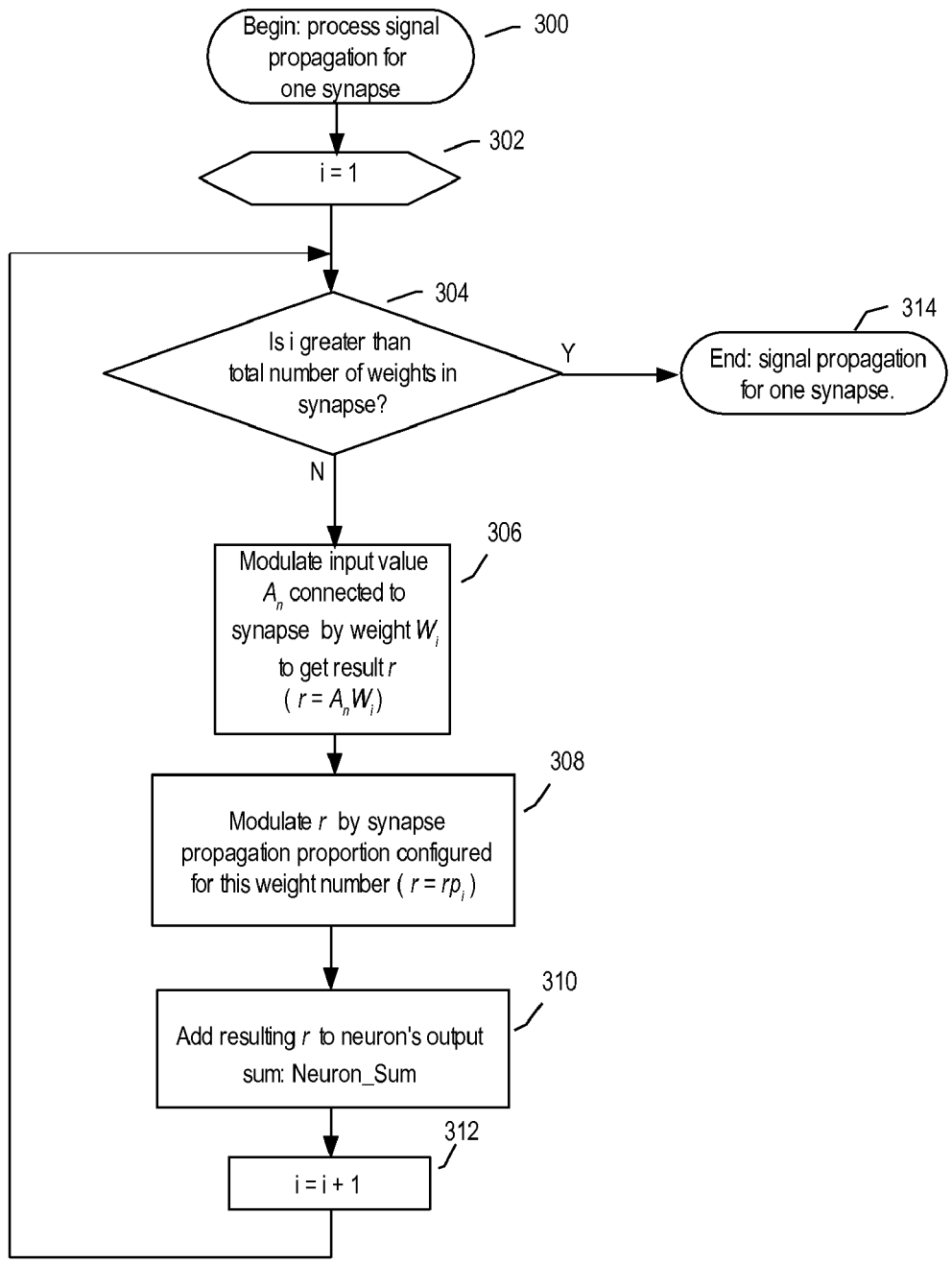
FIG. 3 is a flow chart showing the steps used to process signal propagation for one synapse in the first embodiment.

Signal Propagation and Modulation by Weight Values—FIG. 3

One main difference of the non-learning, or signal propagation, operation of the neuron from the prior-art is that the input value connected to each synapse is modulated, or gated, separately by each of the multiple respective weights comprising the synapse. In this example, the neuron has three weights in each synapse, so the single value connected to the synapse is multiplied by the three separate weights, passing each result on to be summed with the results of all the other synapse modulation operations. In the prior-art each input value is multiplied by a single weight value to produce a single result that is then added to the sum.

FIG. 3 is a flow chart showing the process steps preformed by the current embodiment for a single synapse during signal propagation phase 300.

The synapse propagation sum is first set to zero. Then, iterating i through each of the three weights associated with a given synapse n in steps 302 and 312 and decision block 304, value An supplied to the synapse is modulated, or gated in step 306 by a respective weight value $W_i$ to produce a result r. Value $A_n$ is an axon level between 0.0 and 1.0, while the weight value can be in the range −1.0 to +1.0. The modulating calculation to get the result r for a given weight i is thus given as:

$$r = A_n W_i$$

Because the weight value may be positive or negative, this modulation calculation will produce a positive or negative result. A positive weight will produce a positive result in this expression, which is roughly equivalent to the function provided by an excitatory synapse in a biological neuron. A negative weight value will produce a negative result in this expression, which is roughly equivalent to the function of an inhibitory synapse in biological neurons, see Levitan, Kaczmarek, "The Neuron, Cell And Molecular Biology", 2002, Oxford University Press, ISBN: 0-19-514523-2.

Figure 4:
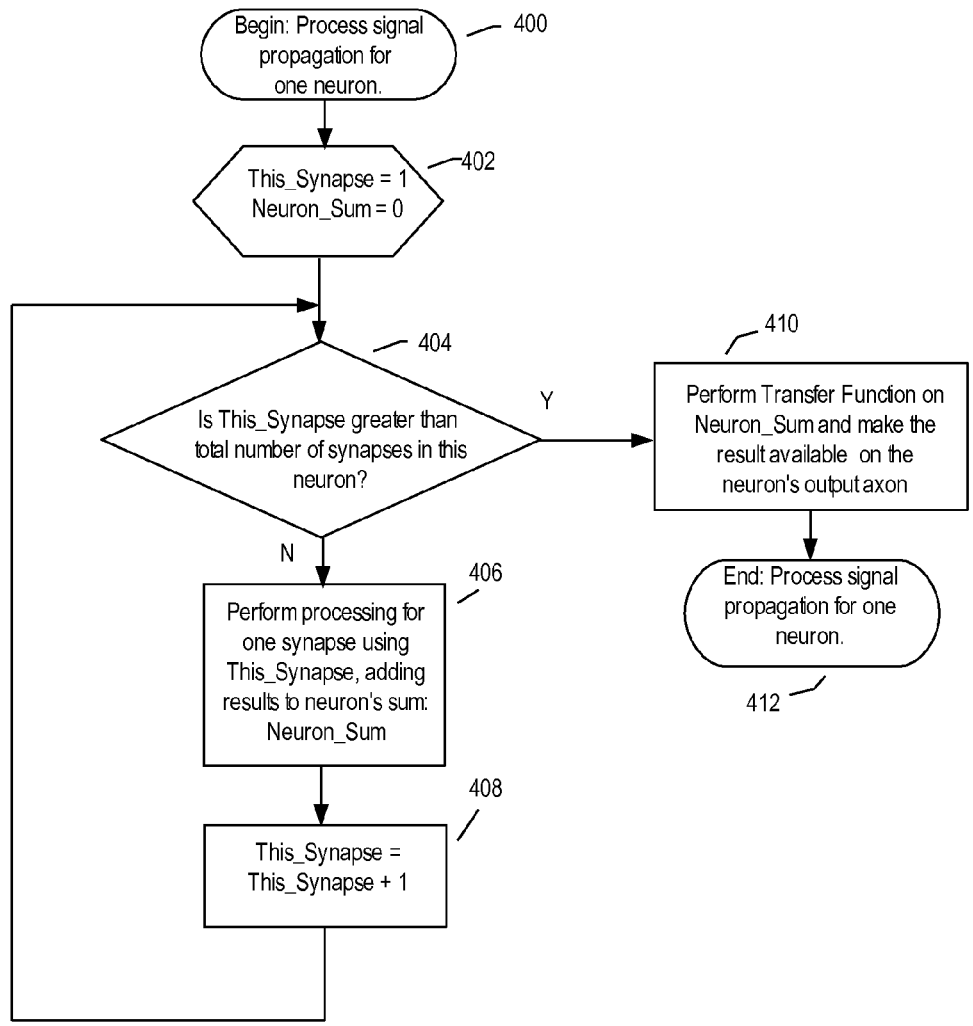
FIG. 4 is a flow chart showing the steps used to process signal propagation for an entire neuron in the first embodiment.

Synapse Propagation Proportion Parameter—FIGS. 2-4

Given multiple weights per a connection, I also provide a parameter to specify what proportion of the modulated inputs to pass on to the summing function (step 308 in FIG. 3). This works in the same way as the modulation equation presented above, but modulates the result r produced by the above equation by a predetermined propagation proportion p for the given synapse weight i. Like the weight modulation formula, it is a simple multiplication in floating point arithmetic and is expressed as:

$$r = rp_i$$

The propagation proportion for weight 1 is 0.005, which means only one half of one percent of the input values modulated by weight 1 in each synapse will be passed on to the summing function and be represented on the neuron's output. The propagation proportions configured for synapse weights 2 and 3 of this embodiment are 0.09 and 1.0 (9% and 100%), respectively.

Finally, after value $A_n$ at the synapse is modulated, or gated, by its respective weight value $W_i$, and further modulated by the propagation proportions predetermined for the synapse weight $p_i$, the result is added to the neuron's internal sum in step 310.

One value is calculated for each synapse weight. All three values, once calculated, are added directly to the neuron's internal sum 110 in FIG. 2.

At the neuron level, depicted in FIG. 4, the synapse propagation steps are preformed for a neuron by iterating through each synapse in neuron with steps 402, and 408 until all synapses (determined in decision block 404) have been processed. The signal propagation steps and decision blocks 300-314 (FIG. 3) for a single synapse are preformed for each synapse in the neuron at step 406 (FIG. 4) and the results are accumulated into an internal neuron sum. Internal sum 110 (FIG. 2) may be less than, or greater than the range permitted on a neuron's output. In this embodiment, the range 0.0 to 1.0 is used. As in any artificial neuron, in order to ensure the sum produced by the above functions does not exceed the limits of the allowable range, a transfer function may be employed in (step 410 in FIG. 4).

For each synapse in the neuron, all the results of all the synapse processes as described above are summed together resulting in the internal neuron sum.

Selecting Transfer Function—FIGS. 2 and 4

A transfer function 410 (FIG. 4) and 112 (FIG. 2) limits the output produced by the neuron to a workable range. It can be as simple as a clipping function, or it may be much more complex depending on needs.

This embodiment uses back propagation as a learning algorithm for one of the three weights in the synapses. A more functional transfer function called a sigmoid function is defined within this embodiment in the event the neuron is employed in a network with hidden layers. Such a transfer function is expressed as:

$$f(x) = \frac{1}{1 + e^{-x}}$$

Here x is the result of the above described modulation and summing facilities, and e is the natural exponentiation constant (2.718281828 . . . ). This will keep the output below 1.0 but will also bias weighted sums near zero to produce an output of approximately 0.5.

The neuron is a single neuron and so is not hidden behind other neurons. Also, the training set comprises only five mappings, all with a desired output of 0.5 or lower. For these reasons, there is no need to specify the sigmoid function for this embodiment. If the neuron were to be used in a network with hidden layers, the sigmoid function would be the better choice for the squashing function, so one will be provided in the source code (Embod1_c.txt in the appended attached files) included with the embodiment. It is made available in the code for when a better transfer function is required.

This embodiment uses a simple clipping function as its transfer function in step 410 (FIG. 4). In this case, if the neuron's internal sum is greater than 1.0 the transfer function returns 1.0 as its result.

Likewise, if the internal sum is less than 0.0, the transfer function will return 0.0 as its result. All other input values to the transfer function will be returned unchanged.

The output value returned by the transfer function is placed on the neuron's output axon 102 (FIG. 2). The output value X is an axon level, which is made available for connection to other neurons as well as to external processes.

Weight Adjustments for Weight Learning—FIGS. 2 and 4-8

In the prior art a neuron will map a set of input stimulus or signals, to a desired set of output responses for any given set of input signals. A neuron "learns" to respond correctly to a given set of input values by having its weight values adjusted, or trained, by a learning algorithm. When a neuron or neural network is having its weights adjusted by a learning algorithm, it is said to be in learning mode, or weight-training mode.

As shown in FIG. 2, there are three weights 206-1, 206-2, and 206-3 configured for each synapse in this embodiment. Different learning adjustment means 214, 214b, and 214c are used for each weight, each employing its own learning algorithm and learning rate. A forget process and forget rate is also provided for each synapse weight. The learning algorithm for the first weight in a synapse uses back propagation, with a learning rate of 0.08, which is fast relative to the other two weights. The learning algorithm for the second and third weights in each synapse both employ a method of training weights called weight-to-weight learning. Weight-to-weight learning will be described in more detail below when discussing these individual weight adjustment procedures. The learning rate for the second and third weights is 0.006 and 0.00007 respectively.

Figure 5:
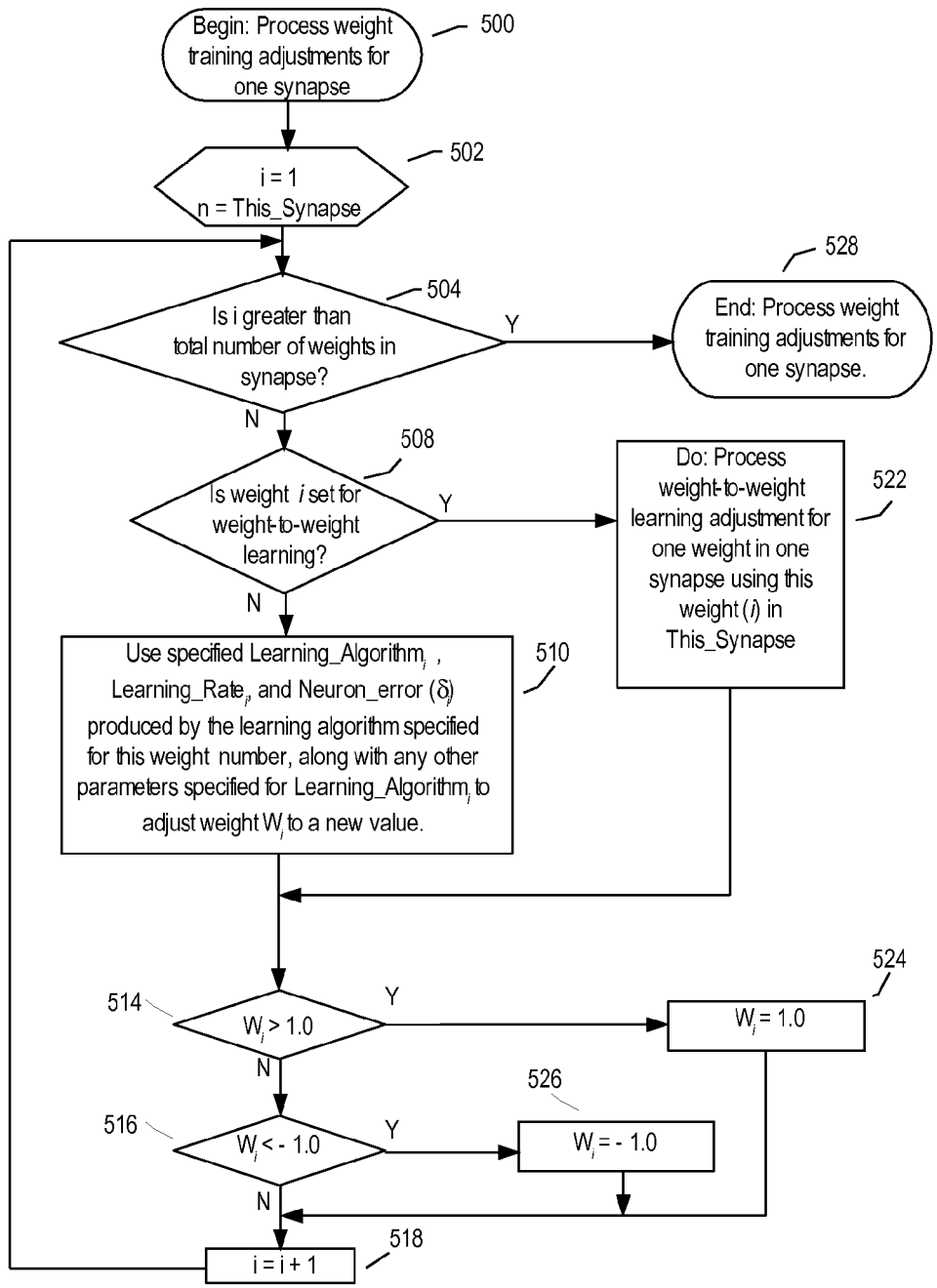
FIG. 5 is a flow chart showing the steps used to adjust weights with learning information for one synapse in a neuron of the first embodiment.

Referring to FIG. 5, iterating for each weight in a synapse with decision block 504 and step 518 it is first determined if the weight is to be adjusted using the weight-to-weight training disclosed here or if it is to be adjusted using some other more conventional learning algorithm, such as back-propagation. In this embodiment, back propagation is the preferred learning algorithm for the first synapse weight.

Individual Synapse Weight Adjustment Using Back Propagation

The calculation for the back-propagation learning algorithm to adjust an individual weight value 510 is performed on the first weight in the synapse. In this embodiment, it is defined as:

$$W_{1ij} = W_{1ij} + \eta_1 \delta_1 A_i$$

Here, i represents the pre-synaptic neuron or process that is connected to the neuron j whose weights are currently being adjusted. Here $W_{1ij}$ is the weight value of the first synapse weight ($W_1$ between pre-synaptic neuron or process i and this neuron j) to be adjusted by the value produced in the calculation. The amount the weight is adjusted is affected by three factors: the learning rate $\eta_1$, the neuron-level error calculated for this synapse weight for this neuron $\delta_1$, and the value $A_i$ connected from the pre-synaptic process or neuron i, to this synapse The weight value produced by the weight adjustment calculation may be greater than +1.0 or less than −1.0. For this reason, it is further limited, or "clipped" to a maximum value of +1.0 (514, 524), and a minimum value of −1.0 (516, 526) if the result of the calculation exceeds these limits.

The calculation of the neuron level error value 61 used to adjust this synapse weight will now be described.

Calculating Neuron Level Error Value for Weight—Back Propagation

Referring to FIG. 2, the first of the three weights 206-1, 206-1b . . . 206-1n in each synapse in this embodiment uses the back propagation learning algorithm.

The back propagation learning algorithm is similar to the prior-art back-propagation learning algorithm. The difference is that the errors produced, and weight adjustments preformed, are for a single one of three weights associated with each synapse within the neuron.

During the back-propagation learning process, the weight values for the first of three synapse weights are adjusted higher or lower to bring the neuron's output value X closer to a desired output. The first step in adjusting the weights with back-propagation is to produce an error term δ 216 for the neuron, from which proportional weight changes described above for each individual weight can be calculated.

If a neuron i is directly connected to the output of the network, the error term is simply the difference between the output produced by the neuron in response to our training pattern during signal propagation $X^{actual}$, and the output we desire for our training pattern $X^{desired}$. It is expressed as:

$$\delta_{1i} = X_i^{desired} - X_i^{actual}$$

If neuron i is not at an output of the neural network, it is a hidden neuron. The formula for calculating the error value at a given hidden neuron i is different than the formula for an output neuron. It may be expressed in terms of the error values that have been calculated at the same synapse weight $W_1$ in all the subsequent (post-synaptic) neurons j to which neuron i is connected, along with the weight value between the two neurons $W_{1ji}$. In this case, a value for error $\delta_1$ for the first synapse weight $W_1$ is calculated using the following expression.

$$\delta_{1i} = \left[\sum_j \delta_{1j} W_{1ji}\right] X_i$$

Here, $\delta_{1j}$ is the error value calculated for the first weight in each of the post-synaptic neurons that this neuron is contacting j. $X_i$ represents the output on the axon of the neuron being trained. That is, $X_i$ is the result that has been produced by the trained neuron's transfer function during signal propagation phase. Because the neuron of the implementation code is a single neuron, it is never hidden behind other neurons, and so will not normally perform this function. The function is included in the code to document it as a necessary component of the neuron when back-propagation is used and the neuron is used in a network with hidden layers.

Figure 7:
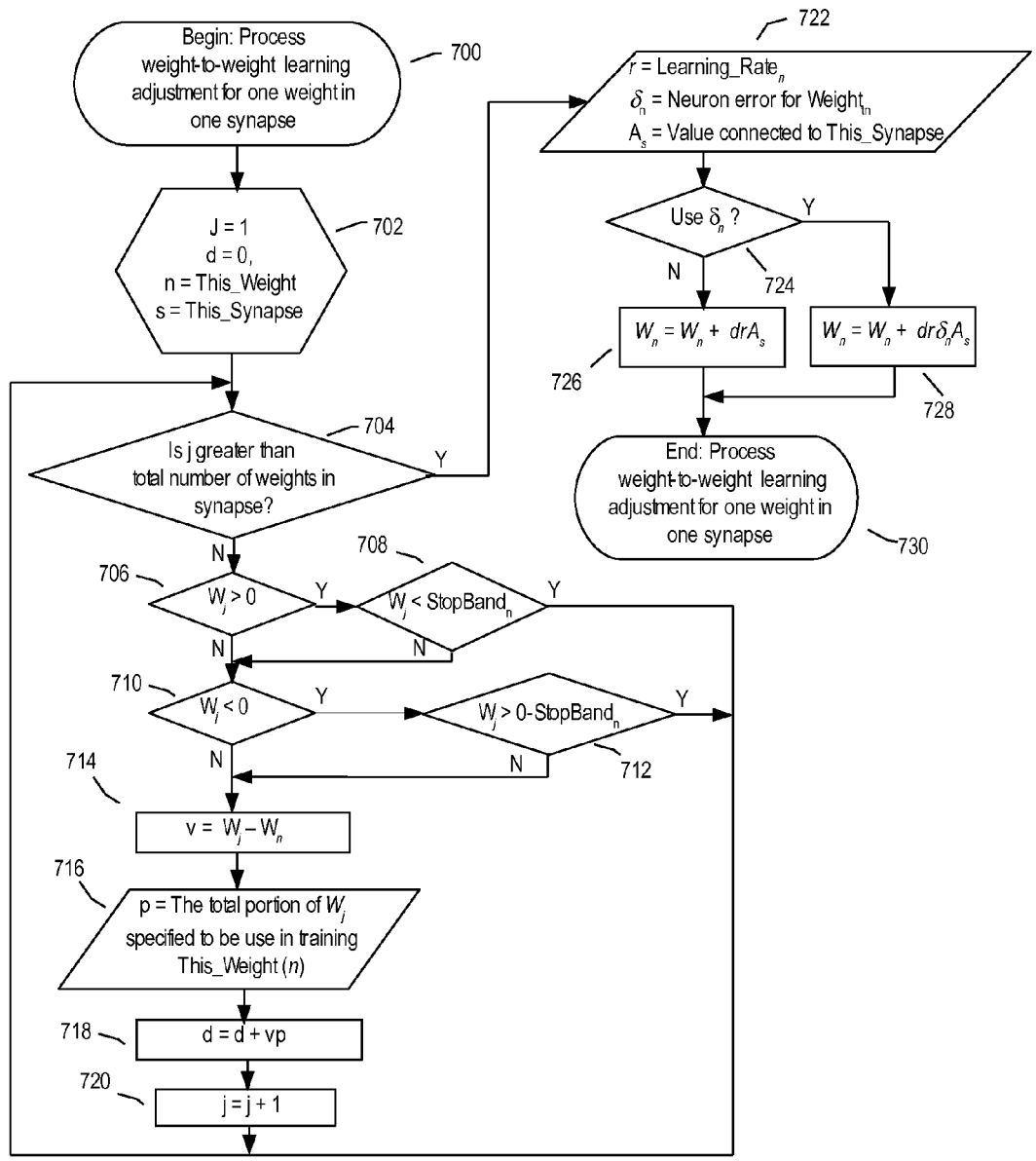
FIG. 7 is a flow chart showing the steps used for weight-to-weight learning for one weight in one synapse of the neurons of the embodiments.

Weight-To-Weight Learning—FIGS. 5 and 7

The second and third synapse weights are adjusted by weight-to-weight learning, or the weight-to-weight learning algorithm, as discussed.

In the method illustrated in FIG. 7, the error value used to adjust an individual weight is derived from the values of the other respective weights in the same synapse. The second synapse weight $W_2$ will be trained using an error value derived from the value of the first weight $W_1$, and the third weight $W_3$ will be adjusted using an error value derived from the second weight. A weight may be adjusted by an error value that is derived from the value of more than one of the respective weights in the synapse as well.

If it is determined in step 508 (FIG. 5) that one of the weights in a synapse is to be adjusted using weight-to-weight learning, then the procedures depicted in FIG. 7 starting at step 700 are used to perform weight-to-weight learning adjustments for the given weight in the given synapse.

FIG. 7 shows in steps 702-720 how the error value d that will be used to adjust the individual weight is calculated using all the other weights in the same synapse. This neuron has three weights in each synapse, two other synaptic weights may be used to contribute to the adjustment error value for a given weight. The delta value for the weight to be adjusted is first set to zero in step 702, then the procedure iterates through each weight in the synapse in steps 704 through 720.

Weight-To-Weight Stop-Band—FIG. 7

For each of the weights in a synapse, first the weight value is tested to see if it falls outside of a predetermined stop band range around zero (decision blocks 706, 708, 710, and 712). Specifying a stop-band effectively shuts off weight-to-weight learning from source weights that are near zero. In this embodiment, the weight-to-weight stop band for both the second and third synapse weights is 0.001. This means that if any of the weights that will contribute to the weight adjustment delta are closer to 0.0 than plus or minus 0.001, they will not contribute to producing the adjustment delta for the weight.

One variation of this stop band is continuous modulation of the error level contributed by the value of the contributing weight. A similar alternative approach has been used in the forget process described in detail below.

Weight-To-Weight Error Value—FIG. 7

If the source weight's value is outside of the stop-band it may then be used to contribute to the delta value d for the weight-to-weight adjustment. The next step 714 calculates the difference between the target weight, and the contributing weight. In this case, the expression is simply a subtraction, expressed as $$v=W_j-W_n$$

Here v is an intermediate weight-to-weight error value, $W_j$ holds the weight value from the same synapse s, which may contribute to the adjustment calculation, and $W_n$ holds the current value of the synaptic weight n to be adjusted. The contributing weight $W_j$ effectively serves as the desired value for training the weight being adjusted, where v represents the delta between the desired value and the actual value of the weight being adjusted $W_n$.

Weight-To-Weight Learning Proportions—FIG. 7

In this embodiment the proportions that each of the other weights will contribute to the delta value d used to adjust the weight $W_n$ are configurable. The second synapse weight $W_2$ uses a proportion of 1.0 (100%) of the error value v derived from the first weight $W_1$ and no portion of other error values derived from other weights. The third synapse weight $W_3$ of this embodiment learns exclusively from $W_2$ at a proportion of 1.0 (100%). Depending on which weight is being adjusted $W_n$, these proportions of the calculated differences v are added to the delta value d in step 718. The delta value d resulting from preforming these steps for each weight in the synapse will be used to adjust weight $W_n$.

Weight-To-Weight Weight Adjustment—FIG. 7

Once steps and decision blocks 706-718 have been performed for each weight j in synapse s, the resulting delta value d is used to adjust weight $W_n$. A neuron level error calculated for the synapse weight can be used in calculation 728 but in this embodiment calculation 726 does not employ the neuron level error value. This embodiment performs weight-to-weight adjustment on the weight being adjusted according to the following expression:

$$W_n=W_n+drA_s$$

In step 726, $W_n$ is the weight having its value adjusted. The variable d is the delta value produced in the steps described above (steps and decision blocks 706-718), r is a learning rate which has been predetermined for the weight being adjusted, and $A_s$ is the value connected to the synapse s, which contains the weight being adjusted.

As has been stated above, the learning rate for weights 2 ($W_2$), and 3 ($W_3$) are 0.006 and 0.00007, respectively.

These steps are preformed and completed for each individual weight 730 for which weight-to-weight learning adjustments have been configured. In the embodiment, the second and third synapse weights ($W_2$, and $W_3$) will both undergo these process steps for each synapse in a given neuron (step 522 in FIG. 5).

Figure 6:
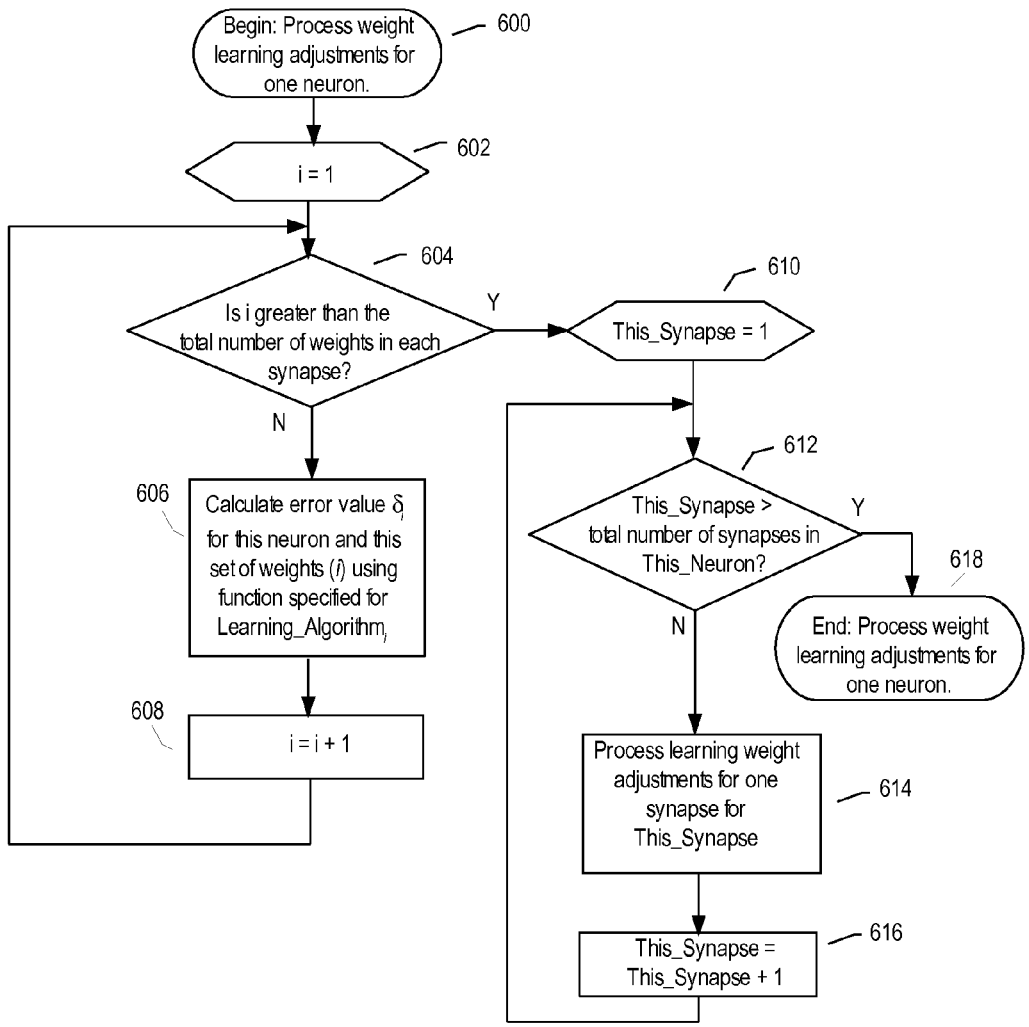
FIG. 6 is a flow chart showing the steps used to adjust weights with learning information for an entire neuron in the embodiments.

Neuron Level Error Value Calculated for Each Synapse Weight—FIG. 6

Referring back to FIG. 6, steps and decision blocks 604-608 are preformed to calculate a neuron level error value for each of the three synapse weights in the neuron. First synapse weight $W_1$ is trained using back propagation. The calculation of its neuron level error value has been described above. After the first weight's neuron level error value has been calculated using back propagation, the error values for the other two weights are calculated. The learning algorithm used to train the second and third synapse weights is weight-to-weight learning, configured without use of a neuron level error value in the individual weight calculations. Had the error value been used, there would be a variety of possible means of producing such a value. One of these would be to simply copy the neuron level error value preformed for back-propagation to the neuron level error values for the weights being trained using weight-to-weight learning.

In this case, since the error value is ignored in the individual weight adjustment calculations, the neuron level error values for the second and third synapse weights is simply set to zero.

Once the three neuron error values for each of the three synapse weights comprising the neuron have been calculated, an index value (This_Synapse) is set to one in step 610 and is used to iterate through all the neuron's synapses (step 616 and decision block 612). Learning weight adjustments are processed for each synapse in step 614 as described above. When all the synapses have been processed, the process to preform weight learning adjustments for one neuron is completed in step 618.

Figure 8:
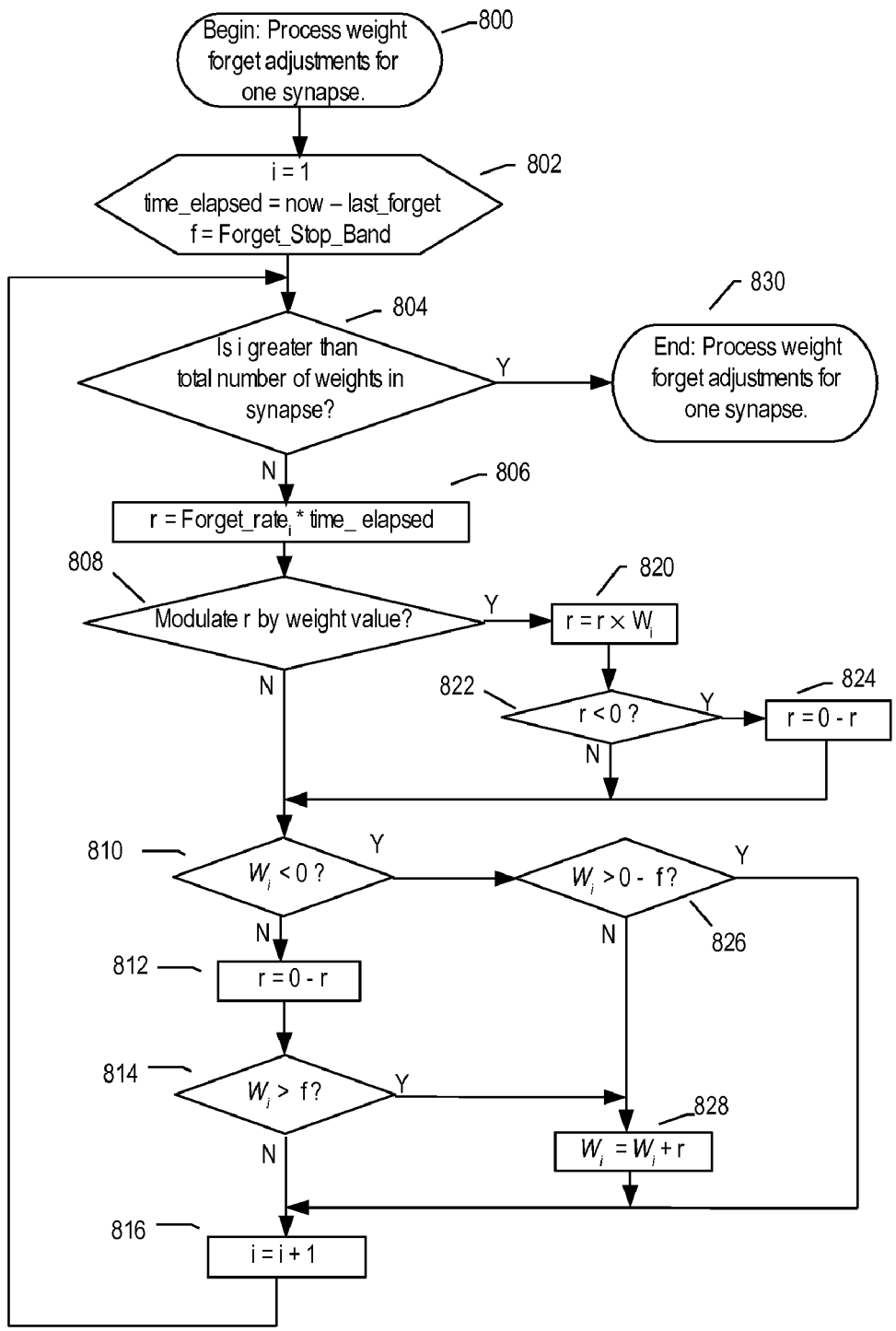
FIG. 8 is a flow chart showing the steps used to process weight forget adjustments for the weights in one synapse of the neurons of the embodiments.
Figure 9:
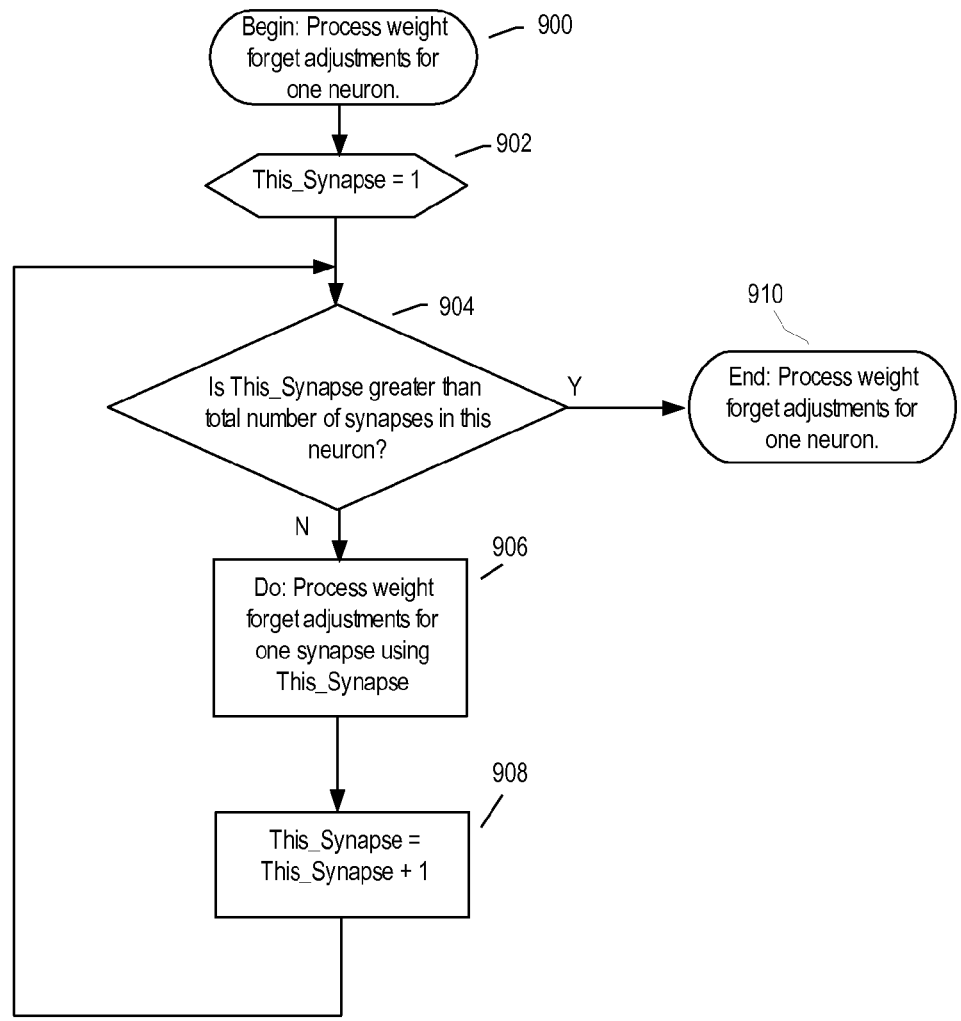
FIG. 9 is a flow chart showing the steps used to process weight forget adjustments for an entire neuron in the embodiments.

Forget Process—FIGS. 8 and 9

A forget process, or forget means, moves synapse weights closer to zero at a configurable rate called a forget rate. This, in turn provides a means of defining weights with varied memory retention times within the same synapse connection.

While in the learning mode, the neuron will move the values on its three synapse weights 206-1, 206-2, and 206-3 in FIG. 2 toward zero at a predetermined rate. This is referred to as a forget process, or forget means. The rate at which a neuron will move its weights towards zero can be configured, and is called the forget rate. The forget process and forget rate are described in more detail below.

The forget rate for each of the three synapse weights has been set at 0.000001 for first weight $W_1$, 0.00000001 for second weight $W_2$, and 0.0 (no forget) for third weight $W_3$. In other words, the weight trained with back-propagation will have the shortest retention time. The weight that learns from first weight $W_2$ will have a longer retention time, while third weight $W_3$ will have the longest retention time. In fact, $W_3$ is configured to have a permanent retention time in this embodiment.

Referring to FIG. 8, the process is carried out for a given synapse 800 the index i is set to 1 in step 802 and is used to iterate through each of the weights in the synapse with decision block 804 and step 816, preforming forget adjustments. For each weight in a synapse, an intermediate adjustment value r is calculated in step 806 using the configured forget rate for the synapse weight and the time elapsed since the last forget process. If the forget rate is configured to be modulated by the weight value (as determined in decision block 808), the adjustment value r is further modified in steps 820 and 824 and decision block 822 by the value of the weight it will adjust. In this embodiment, the forget rate has been configured to be modulated by the weight value for second synapse weight $W_2$ and third synapse weight $W_3$ in each synapse.

Adjustment value r is also checked against any of configured stop bands in step 812 and decision blocks 810, 814, and 826 before being used to adjust the given weight value in step 828. This embodiment doesn't use a forget stop band so the calculated forget rate will be used to adjust the weight value all the way to zero. Had a stop band been configured, the forget process would effectively stop moving the weight value toward zero, once it was within plus or minus the stop band value. For example, if the stop band is configured to be 0.01, the forget process will continue to adjust the weight toward zero until it is reduced to within plus or minus 0.01 of zero. If the weight value is within plus or minus 0.01, the forget process will be suspended for that weight until its value increases or decreases to a value that is greater or less than the stop band range.

The weight forget adjustments process for the synapse is completed at step 830 when all the weights in the synapse have been processed.

Referring to FIG. 9, weight forget adjustments are preformed for an entire neuron 900 by repeating the steps to process weight forget adjustments for one synapse, for each synapse in the neuron. This is accomplished by starting at the first synapse, setting the index This_Synapse to 1 in step 902 and iterating through all the synapses with decision block 904 and step 908, performing the steps to process weight forget adjustments for one synapse for each synapse (step 906). When all the synapses in the neuron are processed the procedure ends at step 910.

Figure 11:
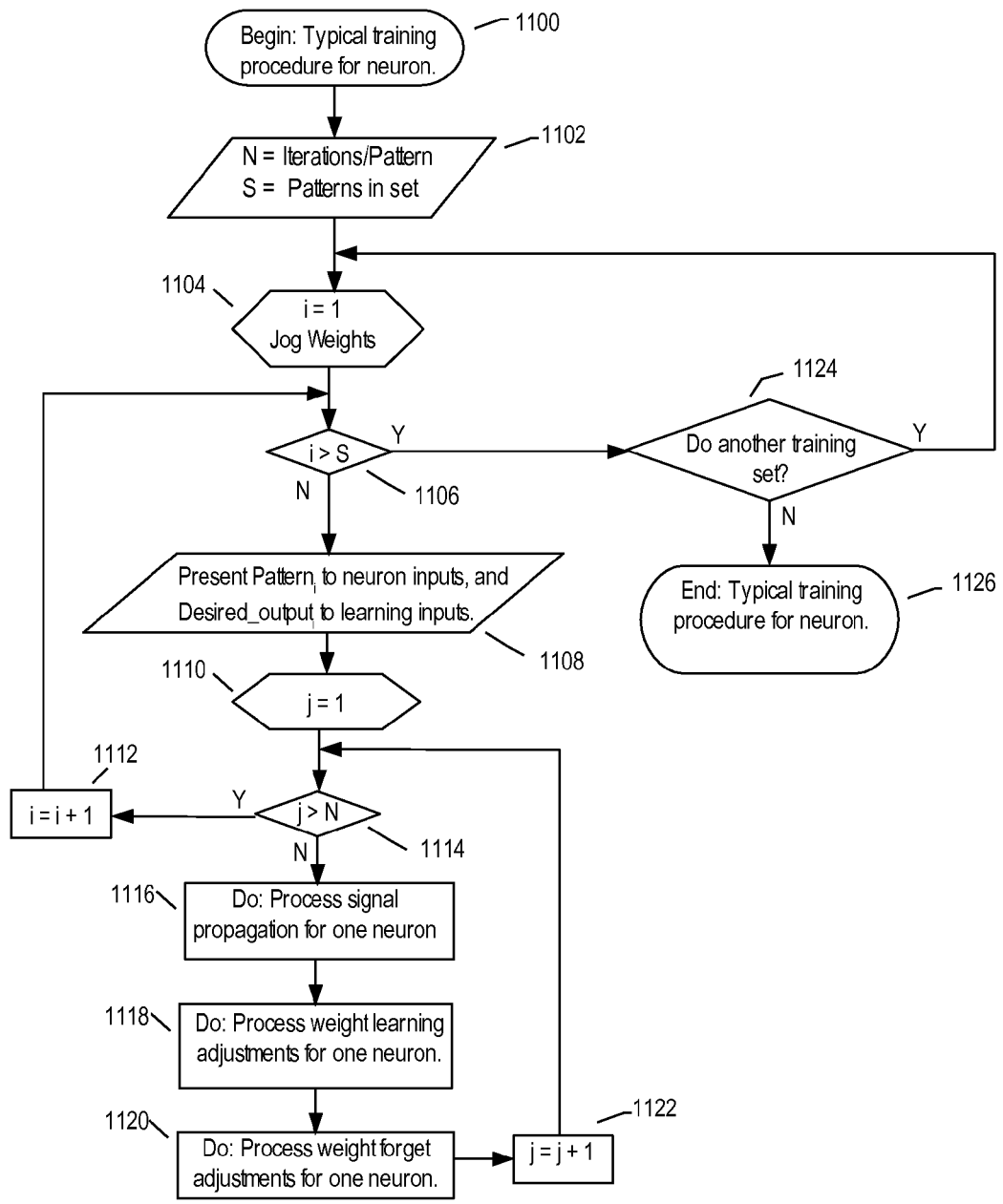
FIG. 11 is a flow chart showing the steps followed to train a neuron.

Weight Training Procedure—FIG. 11

In both embodiments, the neuron, or the neural network it is part of, may be trained according to the procedure documented in the flow chart of FIG. 11, and in source code (Embod1_c.txt in the appended attached files). Referring to the flow chart in FIG. 11, beginning at step 1100, a set of pre-defined patterns are presented in sequence to the neuron along with desired output responses to be learned by employing the steps 1104, 1106, and decision block 1114. Each pattern, along with its desired output value, is presented to the neuron for some number of iterations using steps 1110, 1122, and decision block 1114, and then the next pattern (step 1112) is presented.

While a given training pattern is presented to the neuron's inputs, the neuron first performs a signal propagation process (step 1116 in FIG. 11) as described above in connection with FIGS. 3 and 4, and in the source code (Embod1_c.txt in the appended attached files).

Once the neuron has preformed the signal propagation process, the output value it produces is used (step 1118) along with the desired output value for the training pattern, to perform the processes for weight learning adjustments described above and in connection with FIGS. 5, 6, and 7, and in the source code (Embod1_c.txt in the appended attached).

Finally, the weight-forget adjustment process step (1120 in FIG. 11) is performed as described above in connection with FIGS. 8 and 9, and in the source code (Embod1_c.txt in the appended attached files). This will effectively move each of the weights towards a value that will produce an output value closer to the desired value on the next signal propagation phase.

Each pattern in the set of training patterns is presented to the neuron (steps 1112 and decision block 1106) for a given amount of time, or for a given number of iterations in steps 1122 and decision block 1114. Once the entire training set has been presented in this manner, it can be presented again, depending on the number of times the operator would like to preform the training procedure. If it is determined in decision block 1124 that another training set is preformed, the weights are jogged by a small randomly generated value in step 1104 and another training set is presented as described above. If no further processing is required by the operator, the training procedure comes to an end in step 1126.

Weight Jogging

After the weights have been individually adjusted, they may be further "jogged" (adding a small random amount to each) by a weight jogging procedure 1102. Weight jogging is not required for neuron weights that have been configured to forget relatively quickly. For weights that include a forget means, any local minima they may get stuck in will be lost as the forget process moves the weights towards zero. For this reason, weight jogging is not essential when the weights are programmed to forget relatively quickly over time. Weight jogging should be preformed for weights that do not forget, or weights that employ a very slow forget rate (over months or years for example). In this case a small random amount added to the weights periodically during learning will help to jog them out of local minima. As stated, in the case of the embodiments disclosed here, however, no ongoing jogging is used.

Weight jogging is used to initialize the weights to a small random value prior to starting the weight signal propagation, learning, and forget processes. This technique provides diversity in each weight's adjustments, which in turn, helps to insure that the neuron makes a smoother transition to its trained state.

FIGS. 5-13—Neuron with Sums for Each Synapse Weight

Figure 10:
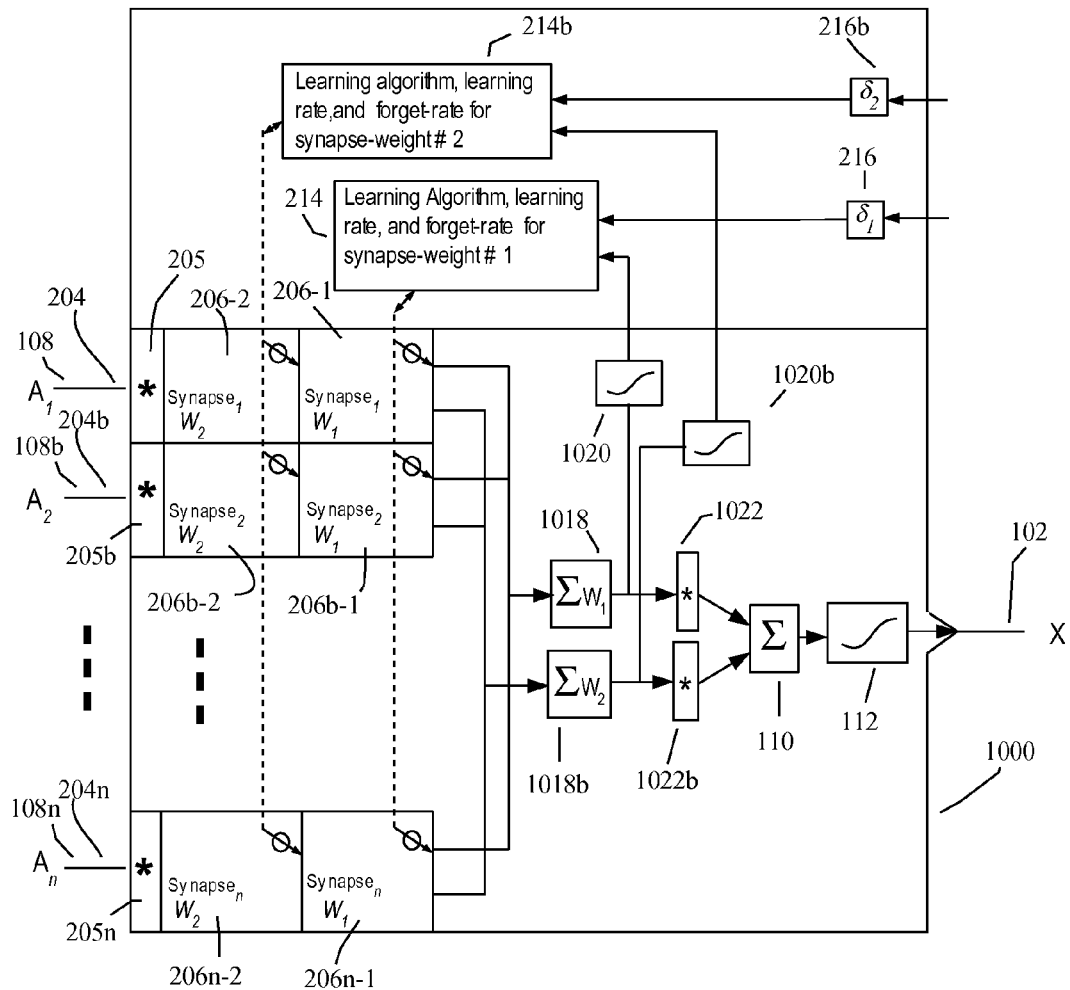
FIG. 10 is a schematic diagram of a neuron of a second embodiment, providing added signal propagation mechanisms to accommodate separate sums for each synapse weight.

FIG. 10 shows a second embodiment that differs from the first in its structure in a variety of ways. In the second embodiment, multiple sums 1018 and 1018*b* are provided, one for each of synapse weights 206-1 and 206-2, in addition to internal sum 110 for the neuron. The extra sums for each weight may also have their own respective transfer functions 1020 and 1020*b* defined. These extra sums and the outputs of their respective transfer functions are made available for use by weight adjustment means and their learning algorithms 214 and 214*b* used for each synapse weight, in addition to the neuron's output and internal sum. For this embodiment, only two weights are used for each synapse, though as many as are required may be used for similar embodiments.

The second embodiment also differs considerably from the first embodiment in the function of the signal propagation processes for each synapse, and for signal propagation for all the synapses in the entire neuron. Finally, the learning algorithm for the first synapse weight $W_1$ in this second embodiment uses the output of one of the individual weight sums described for the embodiment, instead of the output of the neuron, to calculate its neuron level error value for that weight.

Neuron Structure—FIG. 10

Referring to FIG. 10, one can see that input axons 108, 108*b* . . . 108*n* provide connection means to connect axon levels $A_1, A_2 \ldots A_n$ to each of synapses 204, 204*b* . . . 204*n*, where each synapse is comprised of two weights 206-1 and 206-2. Also the value connected to the synapse is modulated, or gated, by each of the two weight values comprising the synapse. This is consistent with the structure related for the first embodiment, except that there are two weights in each synapse ($W_1$ and $W_2$) in this embodiment, while the first embodiment used three.

Weight Sums—FIG. 10

The structure of the second embodiment (FIG. 10) diverges from the first embodiment (FIG. 2) in how the results of weighted input signals are summed and maintained. Continuing with FIG. 10, separate summing operations 1018 and 1018*b* are shown for each of the two weights defined for the synapses of the embodiment. These are referred to as weight sums. Furthermore, transfer functions 1020 and 1020*b* may be defined for each of these sums. Their values are made available to weight adjustment facilities 214 and 214*b*, including learning algorithms used to adjust each weight in the embodiment. Modulation means 1022 and 1022*b* are provided for each weight sum maintained for each weight. Each modulation means will pass, or gate, a configured proportion of each weight sum on to the neuron's internal sum 110. The configured weight sum proportion to be used for the first weight sum is 0.0005 (0.05%), and the configured proportion for the second weight sum is 1.0 (100%).

Once the pre-configured proportions of each weight sum have been added to the neuron's internal sum 110, the internal sum is passed through a transfer function 112. The resulting value (X) is then made available on the neuron's output axon 102.

As in the first embodiment, neuron level error values 216 and 216b are maintained for use by each learning algorithm in each synapse weight's weight adjustment facility.

Operation—FIGS. 5-9 and 11-13

As stated, the primary difference in the operation of the second embodiment is that it sums the results of modulating each input by each synapse weight separately during signal propagation phase. It makes each of these separately maintained weight sums available for use by the individual learning algorithms associated with each synapse weight.

Figure 12:
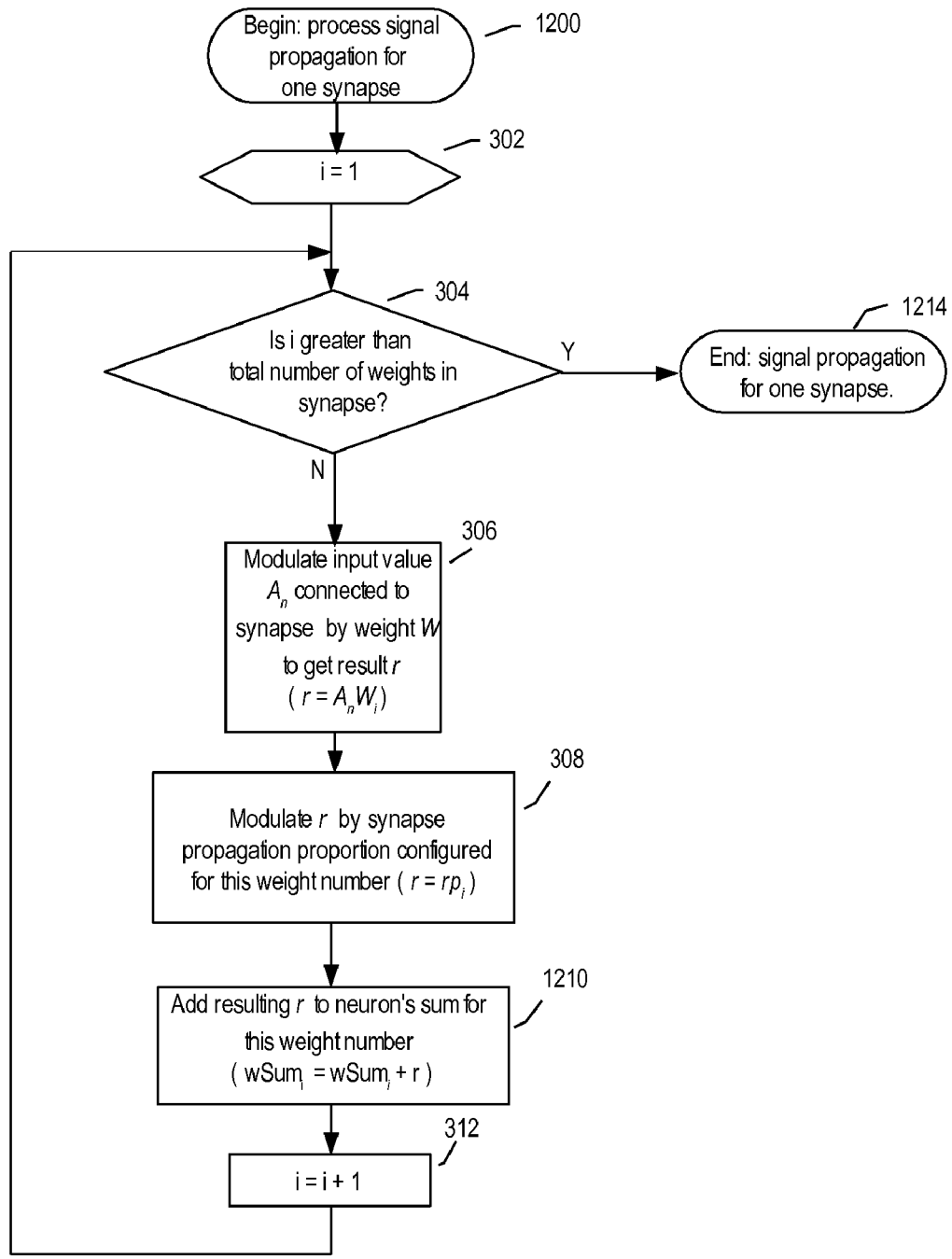
FIG. 12 is a flow chart showing the steps used to process signal propagation for one synapse in the second embodiment.

Signal Propagation Process for Each Synapse—FIG. 12

FIG. 12 is a flow chart showing the steps preformed by a synapse of the second embodiment during signal propagation. This flow chart replaces the flow chart of FIG. 3 of the first embodiment. It shows common process steps using the original numbers from the flow chart used to describe these steps in the first embodiment. It shows new steps with new numbers used in this second embodiment.

Within each synapse, the results of each weight modulation and proportion calculation are added to that weight's respective weight sum instead of the sum for the entire neuron. Starting with the process for signal propagation for one synapse 1200 of the second embodiment in FIG. 12, each weight in the synapse is iterated through in steps 302 and 304 and decision block 312. The input value at the synapse is modulated by the synaptic weight in step 306 by multiplying the input value by the weight (in floating point).

A predetermined portion of the result is then calculated in step 308. The summing portions used when calculating the portion of the result are 0.87 (87%) for the first synapse weight, and 1.0 (100%) for the second synapse weight. The proportion of the result of modulating the input by each synapse weight is then added to the respective weight's weight sum 1210. When all the synapse weights in a synapse 304 have been iterated through in this manner, the signal propagation for a synapse of the second embodiment is completed in step 1214.

Figure 13:
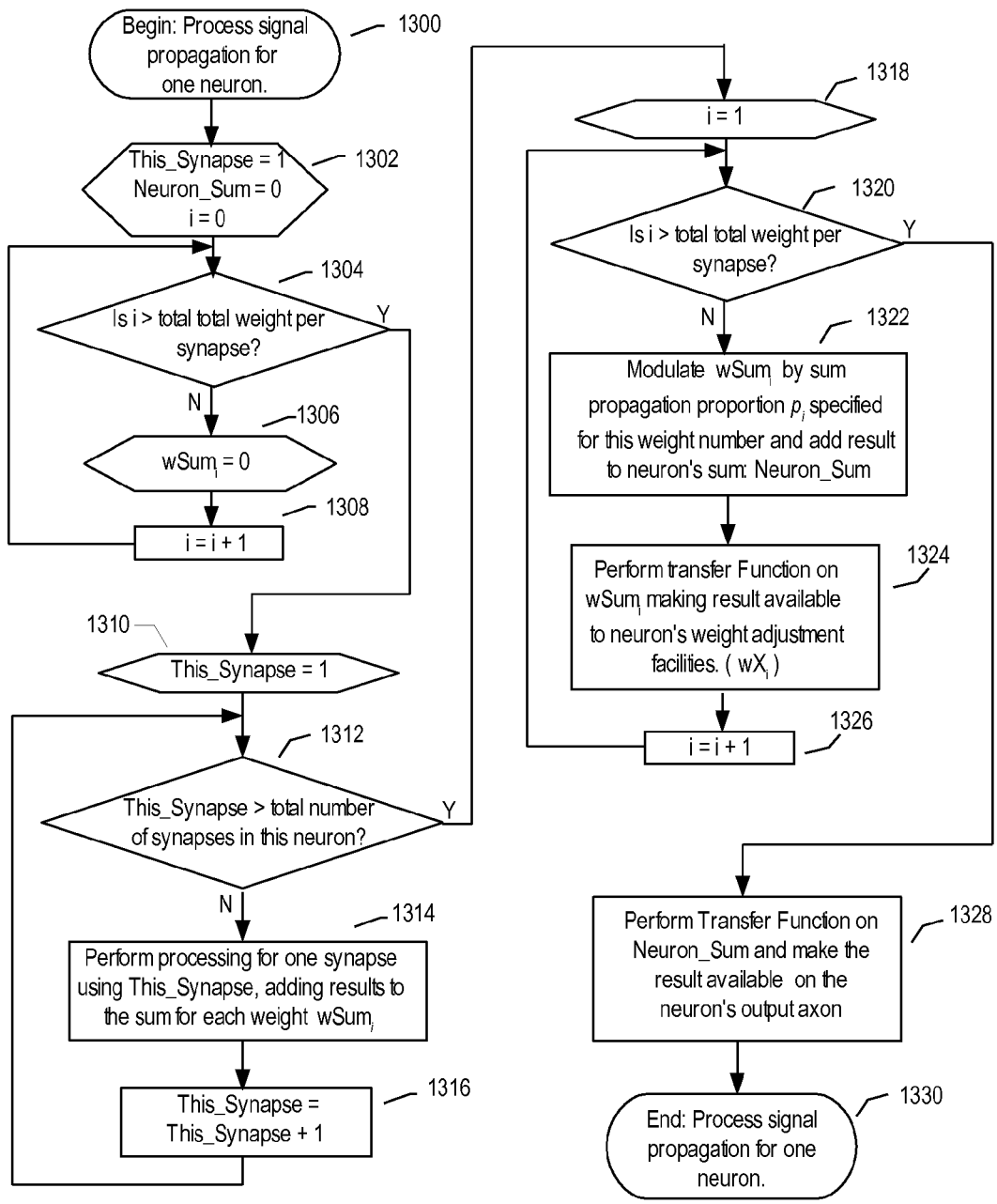
FIG. 13 is a flow chart showing the steps used to process signal propagation for an entire neuron in the second embodiment.

Signal Propagation Process for Neuron—FIG. 13

As shown in the flow chart of FIG. 13, there are considerable differences in the way signal propagation is preformed according to the second embodiment. Prior to propagating the signal, the sums, including each of the weight sums, are initialized to zero in decision block and steps 1302-1308. The signal propagation process for each synapse as discussed above for the flow chart of FIG. 12 is then performed for each synapse in the neuron in the decision block and steps of 1310-1316. As each synapse is processed in step 1314 according to the procedure discussed above in connection with FIG. 12, separate sums, called weight sums, are accumulated for each of the two weights configured for synapses in the neuron.

Continuing with FIG. 13, when it is determined in decision block 1312 that weight sums have been accumulated for each of the two synapse weights for all synapses in the neuron, a proportion of each weight sum is added to the neuron's internal sum in step 1322. The neuron output is mainly representative of the second, slower, weight's weight sum. Therefore, the entire weight sum for the second weight is passed to the neuron's internal sum. A relatively small portion, specifically 0.005, of the weight sum for the first weight is also passed through to the neuron's internal sum.

Each weight sum is also passed to a transfer function in step 1324 of the flow chart of FIG. 13 where it is made available to the learning algorithms for each of the synapse weights. As in the first embodiment, the internal sum is itself passed to a transfer function in step 1328. The resulting output value (X) is made available on the neuron's output axon (102 in FIG. 10) for connection to other neurons and to outside processes.

Weight Adjustments for Learning—FIGS. 5, 6, 7

The neuron of this embodiment employs the processes documented and described for the first embodiment, and in the flow charts of FIGS. 5, 6, and 7, to preform learning adjustments to its weights. The learning algorithm for the first weight is a simplified training procedure similar to back-propagation for an output neuron. The learning algorithm, or learning means, for the second weight uses weight-to-weight learning using the value of the first weight to produce its adjustment value.

The learning rate for the first weight is 0.002. The forget rate for the first weight is 0.0008. This is approximately six to seven times faster than the learning rate of 0.0003 and forget rate of 0.00000001 for the second weight. This effectively configures the first weight with a faster learning acquisition time, and a shorter learning retention time than the second weight.

Weight Adjustment for First Synapse Weight

The learning algorithm for the first weight, while similar to that used for the first weight in the first embodiment, has some differences. This learning algorithm will be documented now.

Referring first to FIG. 5, just as in the first embodiment if the weight is not adjusted using the process for weight-to-weight learning adjustments (decision block 508), it will be adjusted using an alternative learning algorithm in step 510. In this second embodiment, the alternative learning algorithm for the first weight is similar to the learning algorithm for the first synapse weight preformed in the first embodiment. It is expressed in the following formula.

$$W_{1ij} = W_{1ij} + \eta_1 \delta_1 A_i$$

Just as in the individual weight adjustment procedure defined for the first embodiment, i represents the pre-synaptic neuron or external process that is connected to the neuron j whose weights are currently being adjusted. $W_{1ij}$ is the individual weight value of the first synapse weight to be adjusted by the value produced in the calculation. In this case, the amount the weight is adjusted is controlled by three factors: learning rate $\eta_1$, the neuron-level error calculated for this synapse weight in this neuron $\delta_1$, and the value $A_i$ connected from the pre-synaptic external process or neuron i to this synapse Referring again to FIG. 5, the weight value produced by the weight adjustment calculation may be greater than +1.0 or less than −1.0. For this reason, it is further limited or "clipped" in the second embodiment to a maximum value of +1.0 (steps 514, and 524), and a minimum value of −1.0 (steps 516, and 526) if the result of the calculation exceeds these limits.

Neuron Level Error for First Synapse Weight

The calculation of the neuron level error value for synapse weight 1 $\delta_1$ used to adjust this synapse weight (step 316 in FIG. 10) will now be described. It differs from the first embodiment in that it uses the weight sum produced for the first weight, instead of the output of the neuron, to determine a neuron level error value for the first weight $\delta_1$. The procedure can be expressed as follows:

$$\delta_1 = X^{desired} - f(\Sigma w_i)$$

Here $\delta_1$ is the error value being calculated for use by the individual weight adjustments described above for the first synapse weight. $X^{desired}$ is the desired output value of the neuron for the input training pattern that was present on the inputs during the last signal propagation operation. The weight sum for the first synapse weight is represented in the formula as $\Sigma W_i$. It is the accumulated sum for the first weight in the synapses in the neuron (1018 in FIG. 10). The function $f(\Sigma w_i)$ represents the output of the transfer function used for the first weight sum (1020 in FIG. 10). In this embodiment, the transfer function is a simple clipping function. That is, if the weight sum is greater than 1.0 the result is 1.0, and if the weight sum is less than 0.0, the result is 0.0. Otherwise, the result of the transfer function is equal to the weight sum for the weight. In the second embodiment this result is subtracted from the desired output to arrive at the error level $\delta_1$ that is used in the calculation to adjust the first synapse weight in each synapse in the neuron.

Individual Weight Adjustment Calculations for Second Synapse Weight—FIGS. 5 and 7

Referring again to the flow chart of FIG. 5, the second synapse weight is configured for weight-to-weight learning, and will be processed according to the procedure for weight-to-weight learning in step 522 and documented in detail in the flow chart of FIG. 7. These flow charts, and the process steps they document, have been described in detail for the first embodiment. The processes performed for weight-to-weight weight adjustments in the second embodiment are identical to the processes preformed for weight-to-weight learning adjustments in the first embodiment. Briefly, an error value is obtained from first synapse weight $W_1$ by subtracting its value from second synapse weight $W_2$ (step 714 of FIG. 7). A portion p of the error value is then used to adjust weight $W_2$ in step 718. Just as for the first embodiment, the learning algorithm for the second weight uses no neuron level error value, and so no neuron error for second weight $\delta_2$ is calculated.

Weight Forget Adjustments—FIGS. 8 and 9

The weight forget adjustments are preformed using the steps documented in the flow charts of FIGS. 8 and 9. The process is identical to the weight forget process, as it is described in detail for the first embodiment. The forget rates for the weights in this second embodiment are 0.0008 for the first synapse weight, and 0.00000001 for the second synapse weight. Briefly each weight within a synapse (FIG. 8, steps 804-828) is moved closer to zero at a predetermined forget rate in step 828, within predetermined restraints. Predetermined restraints preferably include modulation by the value of the weight in steps 808 and 820, or prevention of further weight-reduction when the weight being adjusted falls within a predetermined stop band around zero in decision block steps 814 and 826. These steps are performed for each synapse within a neuron according to the steps documented in FIG. 9 and discussed in detail for the first embodiment.

Training Procedure—FIG. 11

In both embodiments, the neuron, or the neural network it is part of, may be trained according to the procedure documented in the flow chart of FIG. 11, and in source code (Embod2_c.txt in the appended attached files). Referring to the flow chart in FIG. 11, beginning at step 1100, a set of pre-defined patterns are presented in sequence to the neuron along with desired output responses to be learned by employing the steps 1104, 1106, and decision block 1114. Each pattern, along with its desired output value, is presented to the neuron for some number of iterations in steps 1110, 1114, and decision block 1122, and then the next pattern (step 1112) is presented.

While a given training pattern is presented to the neuron's inputs, the neuron first performs a signal propagation process (step 1116 in FIG. 11) as described above in connection with FIGS. 12 and 13, and in the source code (Embod2_c.txt in the appended attached files). The output value it produces is then used in step 1118, along with the desired output value for the training pattern, to perform the processes for weight learning adjustments described above and in connection with FIGS. 5, 6, and 7, and in the source code (Embod2_c.txt in the appended attached files). Finally, the weight forget adjustment process step (1120 in FIG. 11) is performed as described above in connection with FIGS. 8 and 9, and in the source code (Embod2_c.txt in the appended attached files). This will effectively move each of the weights towards a value that will produce an output value closer to the desired value on the next signal propagation phase.

Each pattern in the set of training patterns is presented to the neuron (steps 1112 and decision block 1106) for a given amount of time, or for a given number of iterations in steps 1122 and decision block 1114. Once the entire training set has been presented in this manner, it can be presented again, depending upon the number of times the operator would like to preform the training procedure. If another training set is preformed, the weights are jogged by a small randomly generated value in step 1104 and another training set is presented as described above. If no further processing is required by the operator, the training procedure comes to an end in step 1126.

The neuron provides a device that is capable of accommodating noisy learning inputs and environments such as those that may be encountered in continuous learning based on environmental reward-and-punishment cues. This, combined with the ability to maintain adaptation memory according to varied acquisition and retention times will make it easier for designers to construct ANNs that continuously learn from their inherently noisy environments using reward punishment cues.

Figure 14:
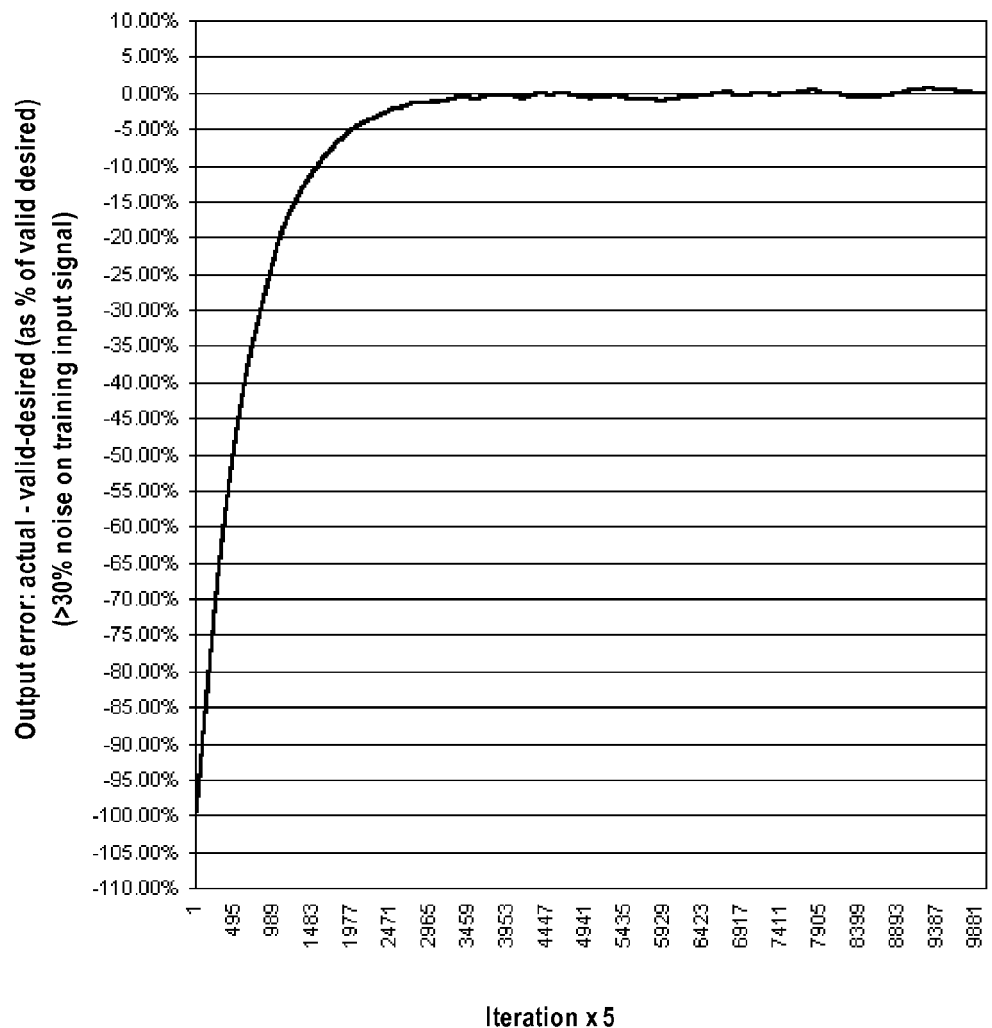
FIG. 14 is a graph showing the error in the output produced by the second embodiment, where every third training signal input is replaced with random noise values.

FIG. 14 shows a graph of the output of the neuron of the second embodiment expressed as a percentage of the difference between the actual output versus the valid training value used to train it. While running the neuron to produce this graph, the valid training value was replaced with randomly generated noise values on every third training iteration. The random noise values used to replace the valid training value were values from 0.0 to twice the value of the valid training value.

CONCLUSIONS, RAMIFICATIONS, AND SCOPE

Thus the reader will see that the embodiments are inherently capable of learning both long-term generalized responses, along with short-term adaptation tasks without overwriting previously learned long-term memories. This furnishes ANN designers with the ability to construct ANNs that will adapt to minute-by-minute, hour-by-hour, and day-to-day environmental changes, while not corrupting previously learned and stored long-term general responses.

By separating learning into two or more different categories, based on differences in the lengths of acquisition and retention times, these neurons provide a variety of practical benefits over the prior-art's single, usually permanent, weight retention time. In many cases, these categories of learned responses may be represented by information of very different structures.

These categories, while differently stored, are related since each is maintained for the same synapse connection. The learning impressed on a longer-term weight is concerned with producing responses that will promote the correct adjustments to its respective short-term weight more quickly. The memory impressed on a shorter term weight is concerned with how to deal with specific adaptation details presented in the moment. In this way, the long-term weights will aid the short-term weights in adapting their detailed responses to the immediate needs of any given moment in time. The short-term weights on the other hand, aided by responses caused by previous experiences that are represented in the long-term weights, quickly adjust themselves to produce novel responses to the current experience. When the experience no longer exists, the short-term weight values quickly fade and are forgotten to make room for the next moment-by-moment experience. This, for example, can lead to construction of ANNs that can be trained to drive a car just as today, but that can also adapt the myriad of detailed responses required to drive on whatever distinctive road may be ahead of the car in any given moment.

These techniques provide another advantage, i.e., a neuron means capable of filtering learning information, which discerns valid signal from noise based on how orderly the unknown signal is over time. A valid signal is characteristically orderly and repetitive, while noise is often random in nature and non-repeating (or at least, much less likely to repeat than valid signal). The ability to filter noise from valid learning information based on randomness and orderliness respectively, provides a neuron that can be continuously trained using noisy learning cues from its normal, ongoing environment. One example of noisy cues is learning based on reward-and-punishment. Reward-punishment learning methods have been difficult to implement in the prior-art because reward-punishment learning cues are inherently noisy.

While my above description contains many specificities, these should not be construed as limitations on the scope, but rather as exemplifications of several embodiments. Many other variations are possible. For example, neuron calculations may be expressed using integer math equivalents to the floating point formulas described here. This saves considerably on energy consumption in large networks of neurons, i.e., it saves the added energy costs associated with using floating-point processing units for each computer processing unit. Other variations include the use of any number of different learning algorithms that are currently available to ANN designers, such as Hebbian learning, correlative learning, associative learning, self-organizing learning, as well as new learning algorithms that may be made available in the future. Any number of multiple synapse weights may be employed for each synapse, along with different combinations of learning algorithms, learning rates, forget processes, and forget rates. Various conventional means used within the embodiments may be expanded upon, or eliminated to suit specific applications. These include the means of specifying synapse proportions to be accumulated by the summing functions, the means of specifying weight sum proportions to be accumulated by the internal sum, the transfer functions for the neuron output or for weight sums, to name some.

ANNs built from the neurons of the embodiments may be used in a variety of applications that include but are not limited to more adaptive autonomous factory automation, autonomous control of unmanned vehicles, pattern and character recognition, artificial intelligence applications including medical diagnosis. They may also be used in most applications where conventional artificial neurons are used today, bringing the added benefit of short-term adaptation of responses which are guided by, but do not interfere with previously learned long-term responses.

Thus, the scope of the embodiment should be determined by the appended claims and their legal equivalents, rather than by the examples given.

The invention claimed is:

1. An artificial neuron component, comprising:
   (a.) at least one artificial synapse, comprising:
      (1.) a connection means that connects an input signal to be conveyed to said artificial synapse, and
      (2.) a plurality of means for storing or supplying a plurality of respective synapse weights or synapse weight values, and
      (3.) a synapse modulating means for modulating said input signal by each of said plurality of respective synapse weights or synapse weight values, thereby to produce a plurality of respective results determined by modulating said input signal by said plurality of respective synapse weights or synapse weight values,
   (b.) a summing means for accumulating said plurality of respective results of said synapse modulating means as an internal sum, and
   (c.) a transfer conversion means for subjecting said internal sum accumulated by said summing means to a predetermined transfer function to provide a resultant output value,
   (d.) a plurality of weight adjustment means, each comprising a predetermined learning means for adjusting a respective one of the synapse weight values within said artificial synapse, and for correcting the value of said respective one of the synapse weight values within said artificial synapse as a function of said predetermined learning means,
   whereby each of said plurality of weight adjustment means will train each of said plurality of respective synapse weights or synapse weight values using a distinct predetermined learning means, and a distinct predetermined learning rate, providing each of said plurality of respective synapse weights or synapse weight values with a distinct predetermined learning acquisition time, and the output of said transfer conversion means is a representation of said input signal, modulated by each of said plurality of respective synapse weights or synapse weight values within said artificial synapse.

2. The artificial neuron component of claim 1, further including a predetermined forget means for adjusting the value of at least one of said plurality of respective synapse weights or synapse weight values within said artificial synapse closer to zero at a predetermined rate and according to a predetermined set of criteria,
   whereby said predetermined forget means will reduce at least one of said plurality of respective synapse weights or synapse weight values according to said predetermined rate, providing each synapse weight with a distinct, predetermined learning retention time.

3. The artificial neuron component of claim 1 wherein at least one of said plurality of weight adjustment means includes a weight-to-weight learning means, comprising:
   (a.) a weight error value calculation means for providing a weight-error value proportional to the difference between a respective one of said plurality of respective synapse weights or synapse weight values being adjusted and at least one other of said plurality of respective synapse weights or synapse weight values in said artificial synapse, and
   (b.) a means for using a predetermined proportion of said weight-error value for altering the value of the respective one of synapse weights associated with said respective weight adjustment means, so as to bring the value of the respective synapse weight closer to the value of at least one other weight values used to produce said weight-error value, whereby said weight-to-weight learning means will adjust at least one of said plurality of respective synapse weights or synapse weight values of said artificial synapse, using the value of at least one other of the plurality of weight values within said artificial synapse as a training value for the respective one of said synapse weights associated with the weight adjustment means.

4. The artificial neuron component of claim 3, further including a predetermined forget means for adjusting the value of at least one of said plurality of respective synapse weights or synapse weight values within said artificial synapse closer to zero at a predetermined rate and according to a predetermined set of criteria, whereby said forget means will reduce at least one of said plurality of respective synapse weights or synapse weight values according to said predetermined rate, providing each synapse weight with a distinct, predetermined learning retention time.

5. The artificial neuron component of claim 3, further comprising a separate weight sum means for each of said plurality of respective synapse weights or synapse weight values, each of said separate weight sum means being arranged to accumulate the results of said synapse modulating means for one of said plurality of respective synapse weights or synapse weight values into a weight sum for the respective synapse weight, and a transfer conversion means for subjecting each of the weight sums accumulated by said separate weight sum means to a predetermined transfer function, producing a resultant value, whereby a plurality of separate weight sums and results of said transfer conversion means are produced for each of said plurality of respective synapse weights or synapse weight values and made available to said plurality of weight adjustment means.

6. The artificial neuron component of claim 5, further including a predetermined forget means for adjusting one of said plurality of respective synapse weights or synapse weight values for said artificial synapse in said artificial neuron component, and for adjusting the value of the synapse weight within each artificial synapse closer to zero at a predetermined rate and according to a predetermined set of criteria, whereby said predetermined forget means will reduce each of said plurality of respective synapse weights or synapse weight values according to a predetermined forget rate, providing each of said plurality of respective synapse weights or synapse weight values with a distinct, predetermined learning retention time.

7. The artificial neuron component of claim 1, further comprising a separate weight sum means for each of said plurality of respective synapse weights or synapse weight values, each of said separate weight sum means being arranged to accumulate the results of said synapse modulating means for one of said plurality of respective synapse weights or synapse weight values in said artificial synapse into a weight sum for the respective synapse weight, and a transfer conversion means for subjecting each of the weight sums accumulated by said weight sum means to a predetermined transfer function, producing a resultant value, whereby a plurality of separate weight sums and results of said transfer conversion means are produced for each of said plurality of respective synapse weights or synapse weight values and made available to said plurality of weight adjustment means.

8. The artificial neuron component of claim 7, further including a predetermined forget means for adjusting one of said plurality of respective synapse weights or synapse weight values for said at least one artificial synapse in said artificial neuron component, and for adjusting the value of the synapse weight within each artificial synapse closer to zero at a predetermined rate and according to a predetermined set of criteria, whereby said predetermined forget means will reduce each of said plurality of respective synapse weights or synapse weight values according to a predetermined forget rate, providing each of said plurality of respective synapse weights or synapse weight values with a distinct, predetermined learning retention time.

9. A method of emulating a neuron for use in artificial neural networks comprising:
(a.) providing at least one synapse means, comprising:
(1.) a plurality of means for storing a plurality of respective synapse weights or weight values, and
(2.) a synapse modulating means for respectively modulating an input signal by each of said plurality of respective synapse weights or weight values, to produce a plurality of respective results,
(b.) accumulating the results of said synapse modulating means for each of said plurality of respective synapse weights or weight values in said synapse means into an internal sum, and
(c.) subjecting said internal sum to a predetermined transfer function to provide a resultant output,
(d.) providing a plurality of weight-adjustment means each comprising a predetermined learning means, for adjusting a respective one of said plurality of respective synapse weights or weight values within said at least one synapse means, and for correcting the value of said respective one of said plurality of respective synapse weights or weight values within said at least one synapse means as a function of said predetermined learning means, whereby said resultant output is a representation of at least one input signal, individually modulated by each of said plurality of respective synapse weights or weight values comprising each of said at least one synapse means, and said weight-adjustment means will train each of said synapse weights using a distinct predetermined learning means, and a distinct predetermined learning rate, providing each of said plurality of respective synapse weights or weight values with a distinct, predetermined learning acquisition time.

10. The neuron method of claim 9, further including adjusting said plurality of respective synapse weights or weight values within each synapse means closer to zero at a predetermined rate and according to a predetermined set of criteria, whereby at least one of said plurality of respective synapse weights or weight values will be moved closer to zero according to a predetermined forget rate, providing each synapse weight with a distinct, predetermined learning retention time.

11. The neuron method of claim 9 wherein at least one of said plurality of weight-adjustment means includes a weight-to-weight learning means, comprising:
(a.) calculating a weight-error value proportional to the difference between said respective one of said plurality of respective synapse weights or weight values being adjusted and at least one other of said plurality of respective synapse weights or weight values in said synapse means, and (b.) using a predetermined proportion of said weight-error value for altering the value of said respective one of said plurality of respective synapse weights or weight values associated with said respective weight-adjustment means, so as to bring it closer to the value of at least one other of said plurality of respective synapse weights or weight values used to produce said weight-error value, whereby said weight-to-weight learning means will adjust at least one of said plurality of weights of said synapse means, using the value of at least one other of the plurality of synapse weights within said at least one synapse means as a training value for the respective one of said synapse weights associated with the weight adjustment means.

12. The neuron method of claim 11, further including providing a predetermined forget means adjusting one of said plurality of respective synapse weights or weight values for said at least one synapse means, and for adjusting the value of the synapse weight within each synapse means closer to zero at a predetermined rate and according to a predetermined set of criteria, whereby said predetermined forget means will reduce each of said plurality of respective synapse weights or weight value according to a predetermined forget rate, providing each synapse weight with a distinct, predetermined learning retention time.

13. The neuron method of claim, 11 further including a separate weight sum means for each of said plurality of respective synapse weights or weight values, said weight sum means being arranged to:

(a.) accumulate the results of said respective synapse modulating means for one of said plurality of respective synapse weights or weight values in each of said at least one synapse means into a weight sum for each of said plurality of respective synapse weights or weight values, and (b.) subject each of said weight sum accumulated to a predetermined transfer function, producing a resultant value, whereby a plurality of separate weight sums and results of said transfer conversion means are produced for each of said plurality of respective synapse weights or weight values and made available to said weight-adjustment means.

14. The neuron method of claim 13, further including providing a predetermined forget process for adjusting one of said plurality of respective synapse weights or weight values for all the synapse means in the neuron, and for adjusting the value of the synapse weight within said at least one synapse means closer to zero at a predetermined rate and according to a predetermined set of criteria, whereby said predetermined forget process will reduce each of said plurality of respective synapse weights or weight values according to a predetermined forget rate, providing each synapse weight with a distinct, predetermined, learning retention time.

15. The neuron method of claim 9, further including a separate weight sum means for each of said synapse weights, said weight sum means being arranged to:

(a.) accumulate the results of said respective synapse modulating means for one of said plurality of respective synapse weights or weight values in each of said at least one synapse means into a weight sum for the respective synapse weight, and (b.) subject each of said weight sum accumulated by said weight sum means to a predetermined transfer function, producing a resultant value, whereby a plurality of separate weight sums and results of said transfer conversion means are produced for each of said plurality of respective synapse weights or weight values and made available for use by said weight adjustment means.

16. The neuron method of claim 15, further including providing a predetermined forget process for adjusting one of said plurality of respective synapse weights or weight values, for said at least one synapse means, and for adjusting the value of the synapse weight within said at least one synapse closer to zero at a predetermined rate and according to a predetermined set of criteria, whereby said predetermined forget process will reduce each of said plurality of respective synapse weights or weight values according to a predetermined forget rate, providing each synapse weight with a distinct, predetermined, learning retention time.

* * * * *

UNITED STATES PATENT AND TRADEMARK OFFICE
CERTIFICATE OF CORRECTION

| | | |
|---|---|---|
| PATENT NO. | : 7,904,398 B1 | |
| APPLICATION NO. | : 11/689676 | |
| DATED | : March 8, 2011 | |
| INVENTOR(S) | : Dominic John Repici | |

It is certified that error appears in the above-identified patent and that said Letters Patent is hereby corrected as shown below:

On the Title Page, Item (57) Abstract, line 13, after "learning and" insert --forget rate. One--.

Signed and Sealed this
Nineteenth Day of April, 2011

David J. Kappos
*Director of the United States Patent and Trademark Office*